United States Patent [19]

Ohta

[11] Patent Number: 5,460,772
[45] Date of Patent: Oct. 24, 1995

[54] PROCESS FOR MULTILAYER BLOW MOLDING

[75] Inventor: Akira Ohta, Futtsu, Japan

[73] Assignees: Nippon Steel Chemical Co., Ltd.; Nippon Steel Corp., Tokyo, Japan

[21] Appl. No.: 995,261

[22] Filed: Dec. 22, 1992

[30] Foreign Application Priority Data

| Dec. 27, 1991 | [JP] | Japan | 3-359301 |
| Dec. 27, 1991 | [JP] | Japan | 3-359302 |
| Aug. 12, 1992 | [JP] | Japan | 4-214947 |
| Aug. 18, 1992 | [JP] | Japan | 4-218977 |
| Sep. 25, 1992 | [JP] | Japan | 4-255157 |
| Sep. 25, 1992 | [JP] | Japan | 4-255158 |

[51] Int. Cl.⁶ .................................................. B29C 49/22
[52] U.S. Cl. ........................ 264/515; 425/523; 425/133.1; 264/171.27
[58] Field of Search ........................ 264/173, 514, 264/515, 541, 176.1; 156/244.13, 244.14, 244.15, 244.25; 425/133.1, 523

[56] References Cited

U.S. PATENT DOCUMENTS

| 3,221,371 | 12/1965 | Stevens | 264/541 |
| 3,257,482 | 6/1966 | Schechter | 264/515 |
| 3,697,632 | 10/1972 | Tenner | 264/541 |
| 3,737,263 | 6/1973 | Schrenk et al. | |
| 3,825,036 | 7/1974 | Stent | |
| 4,063,865 | 12/1977 | Becker | |
| 4,182,582 | 1/1980 | Youval et al. | |
| 4,907,957 | 3/1990 | Nakagawa et al. | 264/541 |
| 5,133,911 | 7/1992 | Kagitani | 264/541 |

FOREIGN PATENT DOCUMENTS

| 537801 | 3/1957 | Canada | 264/515 |
| 0123208 | 10/1984 | European Pat. Off. . | |
| 0147324 | 7/1985 | European Pat. Off. . | |
| 0255043 | 2/1988 | European Pat. Off. . | |
| 0385942 | 9/1990 | European Pat. Off. . | |
| 2274435 | 1/1976 | France . | |
| 2299957 | 9/1976 | France . | |
| 2306819 | 11/1976 | France . | |
| 2823999 | 5/1979 | Germany . | |
| 3623308 | 1/1988 | Germany . | |
| 37-28084 | 10/1962 | Japan . | |
| 51-100163 | 9/1976 | Japan . | |
| 52-89171 | 7/1977 | Japan . | |
| 58-018232 | 2/1983 | Japan | 264/515 |
| 58-208021 | 12/1983 | Japan . | |
| 60-021229 | 2/1985 | Japan | 264/512 |
| 60-168625 | 9/1985 | Japan . | |
| 61-098525 | 5/1986 | Japan | 264/515 |
| 62-104707 | 5/1987 | Japan . | |
| 62-138227 | 6/1987 | Japan . | |
| 63-99815 | 6/1988 | Japan . | |
| 63-101512 | 7/1988 | Japan . | |
| 63-106984 | 7/1988 | Japan . | |

(List continued on next page.)

OTHER PUBLICATIONS

Patent Abstracts of Japan, vol. 10, No. 189, Jul. 3, 1985 of JP61–32733, Feb. 15, 1986.

Primary Examiner—Catherine Timm
Attorney, Agent, or Firm—Armstrong, Westerman, Hattori, McLeland & Naughton

[57] ABSTRACT

This invention provides a blow molding process for manufacturing multilayer hollow articles having sections different from one another in respect to the kind of resins, number of layers, and thickness of layers along the circumference in the horizontal section of an article with the narrowest of the sections in any one of the resin layers extending in a specified width along the longitudinal wall of an article and being capable of satisfying the sectional performance requirements, an apparatus, and said hollow articles. It also provides a process for manufacturing multilayer hollow articles with the wall thickness ratio of resin layers in each section varying along the longitudinal wall of an article or those with the sectional width in each resin layer varying along the longitudinal wall of an article, an apparatus, and said hollow articles. Hollow articles molded by the process and apparatus of this invention are particularly useful for automotive bumpers, the seats and backs of chairs, and boiler-room doors.

6 Claims, 41 Drawing Sheets

FOREIGN PATENT DOCUMENTS

| | | |
|---|---|---|
| 2-88214 | 3/1990 | Japan . |
| 2-113908 | 4/1990 | Japan . |
| 2-162027 | 6/1990 | Japan . |
| 3-57020 | 5/1991 | Japan . |
| 3189109 | 8/1991 | Japan .................................. 264/515 |
| 4-14427 | 1/1992 | Japan . |
| 4-234623 | 8/1992 | Japan . |
| 279074 | 2/1952 | Switzerland . |
| 996432 | 6/1965 | United Kingdom . |
| 1111054 | 4/1968 | United Kingdom . |

FIG. 22A
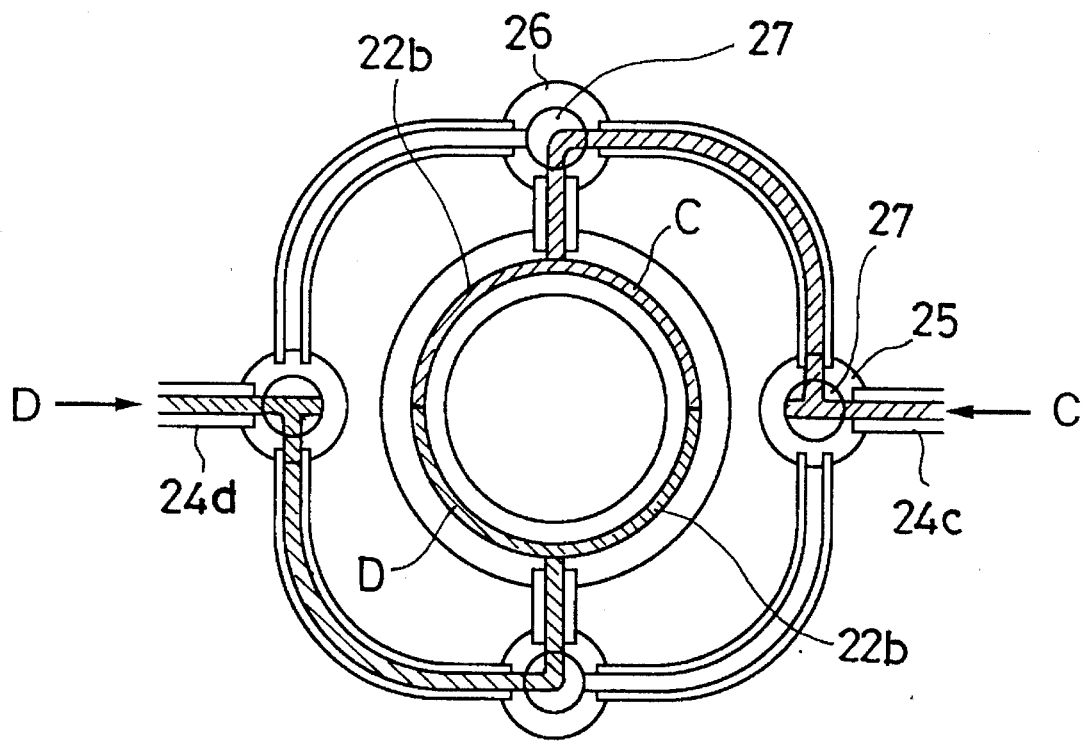
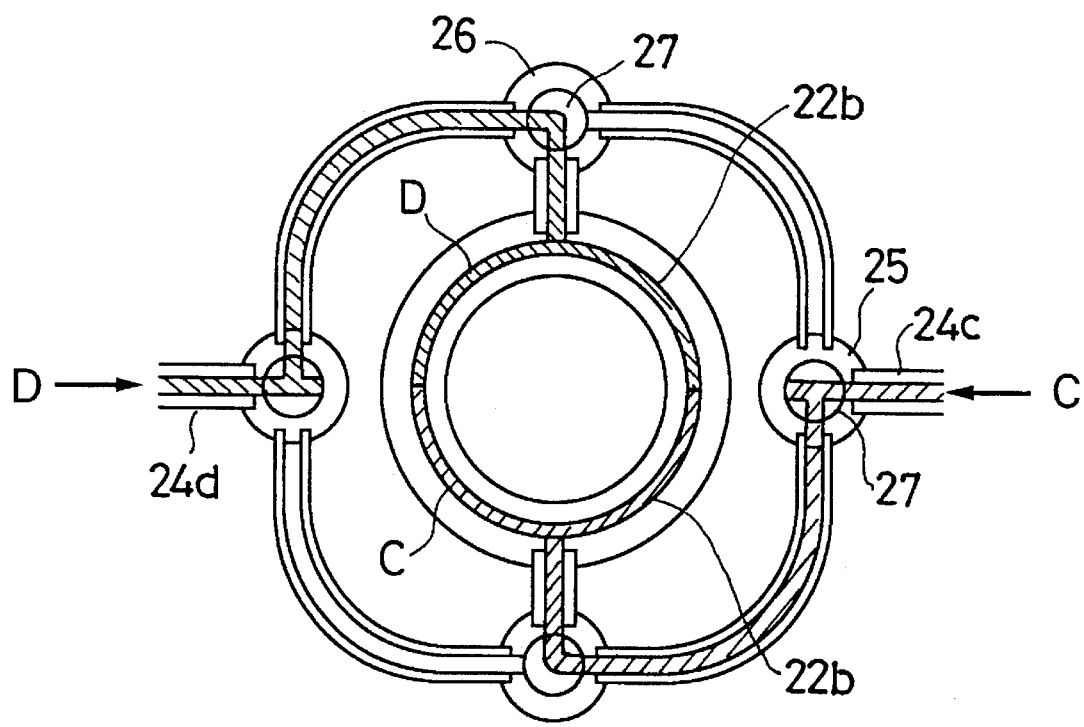
FIG. 22B

PROCESS FOR MULTILAYER BLOW MOLDING

FIELD OF THE INVENTION AND RELATED ART STATEMENT

This invention relates to a novel process for multilayer blow molding, an apparatus to practice the process, and hollow articles molded by the process. More particularly, it relates to a process for multilayer blow molding to produce hollow articles which have two or more layers in the transverse direction and also two or more sections of different resins in any one of the multiple layers around the circumference, to a multilayer blow molding apparatus to practice the process, and to hollow articles molded by the process.

Numerous proposals have been made on blow molding processes for producing hollow articles having multiple layers of several kinds of thermoplastic resins, apparatuses, or hollow articles. Some of them are cited below by the structure multilayer parisons to be created.

A multilayer parison P disclosed in Japan Kokoku Tokkyo Koho Nos. Sho 52-37,026 (1977) and Sho 57-53,175 (1982) and others has resin layers 1 and 2 concentrically formed by resins A and B in its horizontal cross section with the ratio of the thickness of resin layer 1 to that of resin layer 2 maintained constant in every part, namely, in the longitudinal direction (the direction of extrusion) and in the circumferential direction as illustrated, for example, in FIG. 49. Blow molding of such multilayer parison P is practiced commercially to produce fuel tanks for automobiles and mayonnaise and ketchup containers for home consumption.

A process known as modified multilayer blow molding disclosed in Japan Kokai Tokkyo Koho Nos. Sho 62-138,227 (1987) and Hei 2-113,908 (1990) and others creates a multilayer parison P, such as illustrated in FIG. 50, which has annular resin layers 1 and 2 concentrically formed by resins A and C as in FIG. 49 cited above and, in addition, has a resin layer 3 of another resin B between the resin layers 1 and 2 in a specified region in the longitudinal wall of the parison. The blow molding of automotive fuel tanks is described here as main application of such multilayer parison P.

A process known as connection blow molding disclosed in Japan Kokai Jitsuyo Shinan Koho Nos. Sho 63-101,512 (1988) and Sho 63-106,984 (1988) creates a multilayer parison P, such as illustrated in FIG. 51, which has annular resin layers 1 and 2 concentrically formed by resins A and B as in FIG. 49 cited above with the ratio of the thickness of resin layer 1 to that of resin layer 2 varying in the longitudinal direction. The production of air intake ducts to be installed in automotive engine rooms is described here as main application of the blow molding of such multilayer parison P. In FIG. 51, the resin layer 1 is thicker than the resin layer 2 at both upper and lower ends of the parsion while the resin layer 2 is thicker than the resin layer 1 in the middle region, but the pattern of the change in the ratio of wall thickness of resin layers is not limited to the one described here.

A process known as exchange blow molding described in Japan Kokoku Tokkyo Koho No. Hei 2-15,373 (1990) discloses a multilayer parison P, such as illustrated in FIG. 52, which has parts of resin A, resin B, and resin A in succession from one end to the other in the longitudinal direction for molding air intake ducts to be installed in automotive engine rooms.

Furthermore, a multilayer parison disclosed in Japan Kokai Jitsuyo Shinan Koho No. Hei 3-57,020 (1991), an invention by one of the present inventors, has two semicircular sections in its horizontal cross section, one section having a two-layer structure consisting of a laminate of two kinds of resins and another single-layer structure of one kind of resin, with this layered structure maintained in the longitudinal direction from one end to the other. The parison in question is described to be advantageous for molding containers for transporting a variety of goods. However, a parison of this layered structure warps in wrinkles towards the single-layer side as soon as it emerges from a die head as shown in FIG. 29 and cannot possibly be used adequately in molding. Besides, the process here is an extremely singular one which utilizes a seven-part mold and it is limited to the molding of special articles of a deep-drawn double-wall structure, not applicable to articles of other shapes. Moreover, no mention is made of a concrete method and a mechanism for molding this type of multilayer parisons in Japan Kokai Jitsuyo Shinan Koho No. Hei 3-57,020 (1991).

The properties of hollow articles produced by blow molding depend primarily on those of thermoplastic resins in use. Therefore, in order to improve the properties of hollow articles, it is extremely important for the articles to vary in properties from region to region and satisfy performance requirements for each region in particular end uses and places of usage.

In automotive bumpers, for example, the fascia is required to be beautiful to look and the beam strong to withstand the shock from a collision. In the seat and back of a chair, the face side that comes into direct contact with a person is required to be made of materials which are elastic, soft to the touch, and not slippery. On the other hand, the back side which is fixed to a frame such as legs to support the weight of a person must have excellent strength and toughness. In the case of a boiler-room door, its outer side is required to have good appearance as it is exposed to human eyes while its inner side provides a barrier against an atmosphere containing high-temperature steam and vapor and floating oil drops and hence must be resistant to heat, hot water, and oils. In addition, the upper and lower edges of the door are placed in contact with lintels and thresholds and move on rails when the door is opened or closed and hence they are required to be abrasion- and heat-resistant. In the production of the above-mentioned articles, it is desirable to select resins which provide the properties for particular performances of various parts of the articles and mold the selected resins into integrated articles.

In the blow molding of the above-mentioned articles, the performance requirements may not be satisfied by providing a multilayer structure merely in the transverse direction and the creation of multiple sections of different kinds of resins becomes essential in the circumferential direction where multilayer parisons are utilized. Also, it becomes necessary to create a multilayer structure in the transverse direction of a parison and multiple sections of different kinds of resins in the circumferentical direction of a parison.

Although the above-mentioned conventional multilayer blow molding processes are able to create a multilayer structure in the transverse direction of a parison, they are unable to create sections of different kinds of resins in the circumferential direction of a parison. In consequence, they are unable to mold hollow articles which can satisfy locally different performance requirements from plural resins having appropriate properties.

Such being the case, the only way to manufacture, for example, automotive bumpers by a conventional process was to mold a fascia and a beam separately and there was no way to mold the two as an integrated article in order to reduce the production cost. Likewise, in the manufacture of the seat or the back of a chair, the face side and the back side had to be molded separately and put together later. Unavailability of a single-step process for the manufacture of an integrated article resulted in higher production cost and caused problems in strength.

OBJECT AND SUMMARY OF THE INVENTION

Accordingly, it is an object of this invention to provide a process for blow molding hollow multilayer articles which have sections different from one another in respect to one or more of the kind of resins, number of layers, and thickness of layers along the circumference of the cross section, one with the smallest width of said sections of different kinds of resins in any one of the resin layers having a width of ⅛ or more of the circumference and extending along the longitudinal wall of the molded article and each section satisfying its respective performance requirements and also provide an apparatus and hollow articles.

Another object of this invention is to provide a process for blow molding hollow multilayer articles which have sections different from one another in respect to one or more of the kind of resins, number of layers, and thickness of layers along the circumference of the cross section, the ratio of the wall thickness of resin layers in each section varying along the longitudinal wall of the molded article and the creation of said sections and the changes in the ratio of wall thickness along the longitudinal wall being effected to satisfy locally different performance requirements of the article and also provide an apparatus and hollow articles.

A further object of this invention is to provide a process for blow molding hollow multilayer articles which have sections different from one another in respect to one or more of the kind of resins, number of layers, and thickness of layers along the circumference of the cross section, the width of each section created in each resin layer varying along the longitudinal wall of the molded article and each section satisfying its respective performance requirements and also provide an apparatus and hollow articles.

A still further object of this invention is to provide blow-molded hollow multilayer articles, for example, automotive bumpers, the seats and backs of chairs, and boiler-room doors, which have multiple sections of different kinds of resins with each section satisfying its respective performance requirements.

Accordingly, the first mode of the process of this invention relates to a multilayer blow molding process for extruding plural thermoplastic resins from a die head in a tubular form to create a parison which is multilayer all around the whole circumference and substantially uniform in wall thickness in every part, introducing said multilayer parison into a mold which is split into several parts and open to receive said parison, and clamping said mold to conduct blow molding which comprises creating a multilayer parison having sections different from one another in respect to one or more of the kind of resins, number of layers, and thickness of layers along the circumference of said parison, with one of the smallest width of said sections of different kinds of resins in any one of resin layers extending in the longitudinal direction of said parison in a sectional width corresponding to a central angle of 45° or more.

In this process, the outermost layer of a multilayer parison is the one which essentially demarcates sections of different kinds of resins and the mold is divided into a number of parts corresponding to said sections of different kinds of resins. When the mold is clamped to perform blow molding, these parts while meeting with one another cut off the boundaries between the sections of different resins and match the boundaries of the sections of different resins along the edge of a square part of the molded article, thus avoiding with certainty the mismatch of said boundaries of the sections of different resins and the damages to the aesthetic quality of the molded article.

An apparatus to practice the first mode of the process of this invention extrudes plural thermoplastic resins from a die head in a tubular form to create a parsion which is multilayer all around the circumference and substantially uniform in thickness in every part, introduces said multilayer parison into a mold which is split into plural parts and open to receive said parison, and clamps said mold to perform blow molding and it may be constructed in the following manner. The die head in question is composed of a multitorus which spreads molten masses of plural resins emerging from extruders into a concentric annular passage, a lotus root which provides passages for the resins to create sections of different resins in each resin layer in the circumferential direction of the parison, an octopus which forms passages between the multitorus and the lotus root, and a nozzle which is located beneath the lotus root and extrudes a multilayer parison. Designating the number of kinds of resins as m (m is an integer and $\geq 2$), that of layers in the extruded parison as n (n is an integer and $\geq 2$), and that of sections different from one another in respect to one or more of the kind of resins, number of layers, and thickness of layers to be formed in the circumferential direction of the parison as p (p is an integer and $8 \geq p \geq 2$), an apparatus may be constructed so that the multitorus has passages to spread molten resins emerging from m inlets into m-fold concentric annular passage, the lotus root has passages to distribute the molten resins to form an m-resin-n-layer-p-section pattern, and the octopus has passages to direct the molten resins previously spread into an m-fold concentric annular passage in the multitorus towards the lotus root having the passages for the m-resin-n-layer-p-section pattern.

In the multilayer blow molding apparatus mentioned above, the multitorus, lotus root, octopus, and nozzle constituting the die head are made independently for easy disassembly and reassembly. This makes it possible to choose a variety of configurations for the lotus root or to choose the kind and number of molten resins to be fed to the multitorus to create multilayer parisons of a variety of structures in respect to the number of kinds of resins m, number of layers n, and number of sections p, and hollow articles molded from such parisons can adequately meet the needs for the articles.

With the use of this multilayer blow molding machine, the attachment of detachable blind rings to the lower openings of the passages in the lotus root to block the outer (n−n') layers out of the passages for the whole n layers makes it possible to utilize a die head designed for the extrusion of multilayer parisons of an m-resin-n-layer-p-section pattern (n is an integer and $\geq 3$) for the creation of multilayer parisons of an m'-resin-n'-layer-p'-section pattern (m', n', and p' are respectively 2 or more and $m \geq m'$, n>n, and $p \geq p'$). Thus, a die head with a given combination of the multitorus, lotus root, octopus, and nozzle can create multilayer parisons having a smaller number of layers and thus a multipurpose apparatus can be constructed.

With the use of a multilayer blow molding apparatus constructed as above, plural thermoplastic resins molten separately are brought together in the die head and extruded through a slit shaped like a circle, an ellipse, or a combination of a circular arc and a straight line in the nozzle located at the tip of the die head to create multilayer parisons having a variety of m-resin-n-layer-p-section patterns and said parisons are molded to yield hollow articles having plural sections of different kinds of resins with each section satisfying locally different performance requirements.

Accordingly, the hollow multilayer articles produced by the first mode of the process and apparatus relate to hollow articles molded by extruding plural thermoplastic resins from a die head in a tubular form to create a parsion which is multilayer all around the circumference and substantially uniform in thickness in every part and blow molding said multilayer parison. The hollow articles have sections different from one another in respect to the kind of resins, number of layers, and thickness of layers in the circumferential direction of the cross section with a section of the smallest width of said sections of different kinds of resins in any one of the resin layers extending along the longitudinal wall of the article in a width of ⅛ or more of the circumference and each section satisfying its respective performance requirements.

An example of the multilayer articles blow-molded by the first mode of the process and apparatus of this invention is automotive bumpers. It is recommended here to choose ABS resin for the fascia for its good appearance and glass fiber-reinforced polypropylene for the beam for its strength to withstand the shock from a collison and for its relatively low cost. Another example is boiler-room doors. It is recommended to choose ABS resin for the outer side for its good appearance, glass fiber-reinforced polyphenylene-sulfide for the inner side for its excellent resistance to heat, oils, and hot water, and polyoxymethylene for the upper and lower edges for its excellent abrasion and heat resistance.

The second mode of the process of this invention relates to a multilayer blow molding process for extruding m kinds (m is an integer and $\geq 2$) of thermoplastic resins from a die head in a tubular form to create a multilayer parison, introducing said parison into a mold which is split into plural parts and open to receive said parison, and clamping said mold to perform blow molding which comprises creating a multilayer parison having p sections (p is an integer and $\geq 2$) of different kinds of resins extending in the longitudinal direction of the parison in a width of a given central angle in the circumferential direction and n layers (n is an integer of 1 or more and is 2 or more in one or more sections) in each section, and making the wall thickness of said multilayer parison substantially uniform regardless of the number of layers n in each section by providing $n_k$ passages ($1 \leq k \leq p$) for molten resins in the die head and feeding any one of the resins constituting the sections other than the kth section through additional passages or a total of $n_k$ passages to said other sections where the number of layers in the first section is designated as $n_1$, that in the second section as $n_2$, that in the pth section as $n_p$, and that in the kth section which is the largest as $n_k$.

An example of multilayer blow molding disclosed in Japan Kokai Jitsuyo Shinan Koho No. Hei 3-57,020 (1991) relates to the formation of a multilayer parison which has two equal sections (p=2) with a sectional width of 180°, one section being composed of multiple layers of resins and the other a single layer of resin. The experiments by the present inventors indicate, however, that the flow rate of molten resins through a multilayer section becomes greater than that through a single-layer section and this tends to cause the multilayer parison being formed to warp in wrinkles towards the side of the smaller flow rate, often making the molding impossible. A remedial procedure in such a case is to let molten resins flow through the same number of passages in the single-layer section as in the multilayer section so that an apparent single layer is actually composed of multiple layers of the same resin. In this way, it is possible to make the wall thickness of a multilayer parison being created substantially uniform and maintain a balance of the flows of molten resins through the multilayer section and the apparent single-layer section. The experiments of the present inventors indicate that it is advisable to control the total flow of molten resins through the multilayer section at 0.7 to 1.3 times, preferably 0.8 to 1.2 times, more preferably 0.9 to 1.1 times, the flow of molten resin through the apparent single-layer section. Such control of the flow of molten resins enables the creation of a multilayer parison with a substantially uniform thickness in every part regardless of the difference in the number of layers n in each section.

A multilayer blow molding apparatus to practice the second mode of the process of this invention extrudes plural thermoplastic resins from a die head in a tubular form to create a multilayer parison with a substantially uniform thickness in every part, introduces said parison into a mold which is split into plural parts and open to receive said parison, and clamps said mold to perform blow molding. Designating the number of kinds of resins to be used for the extrusion of a multilayer parison as m (m is an integer and $\geq 2$), the number of layers in the extruded multilayer parison as n (n is an integer equal to 1 or more and is 2 or more in one or more sections), and the number of sections different from one another in respect to one or more of the kind of resins, number of layers, and thickness of layers in the circumferential direction of the parison as p (p is an integer and $8 \geq p \geq 2$), the aforesaid die head is composed of a multiple annular passage which is constructed by assembling passage-forming tubes in the number corresponding to n and a shell and a nozzle which is attached to the lower end of the multiple annular passage and extrudes a multilayer parison. The aforesaid passage-forming tubes have slots in the outer wall in the number corresponding to p and form passages for molten resins coupled with the inner wall of the adjacent outside tubes and resin distribution tubes connect the tips of extruders in the number corresponding to that of the kind of resins m and the upper end of each passage in the aforesaid multiple annular passage.

In this multilayer blow molding apparatus, it is desirable to provide the same number of extruders as that of the number of kind of resins m, at least one branch-off point and at least one junction in a resin distribution tube and a flow switchover valve at the branch-off point or the junction or both. The provision of a branch-off point and a junction in a resin distribution tube and a flow switchover valve makes it possible to control the amount of molten resins flowing from the tips of the extruders through the resin distribution tubes to the multiple annular passage and this in turn makes it possible to vary the number of kind of resins m, number of layers n, and number of sections p of the multilayer parison to be created without taking time for the change of parts related to the die head and passages of resins and produce multilayer parisons with a variety of patterns required for hollow molded articles.

Thus, the second mode of the process for multilayer blow molding and apparatus make it possible to bring together separately molten plural thermoplastic resins inside the die head, extrude the molten resins through a slit in the nozzle located at the tip of the die head to create a multilayer parison with a variety of patterns differing in the number of kind of resins m, number of layers n, and number of sections in the circumferential direction of the parison p, and mold the parison to yield hollow articles having multiple sections of different kinds of resins with each section meeting its respective property requirements.

Particularly desirable articles moldable by the second mode of the process and apparatus are chairs with their seats and/or backs molded from thermoplastic resins and a variety of tables. More specifically, designating the number of resin layers in the face side as $n_f$ and that in the back side as $n_b$, the relationship $n_f \neq n_b$ holds and the exposed outermost resin layer has two sections constituting the face and the back. Each section here is formed by different resins, $n_f$ being preferably 3 and $n_b$ apparently 1.

It is desirable in the case of the seat and/or the back of a chair that, of the three resin layers on the face side, the outer layer in direct contact with the human body is formed by a flexible resin with a flexural modulus of 5,000 kgf/cm$^2$ or less and a Shore hardness A of 80 or less, the middle layer by an adhesive resin, and the inner layer by a hard resin with a flexural modulus of 10,000 kgf/cm$^2$ or more and a Rockwell hardness of 60 or more. It is also desirable that the resin layer on the back side is formed by the same hard resin as in the inner layer on the face side. As for the three resin layers on the face side of a table, the exposed outer layer is formed by ABS resin, the middle layer by an adhesive resin, and the inner layer by an olefinic elastomer. On the other hand, the resin layer in the back side of the table is formed by a resin in the same category of the resin forming the inner layer of the face side. Of the chairs and tables molded from thermoplastic resins in this manner, particularly relevant examples are chairs having a small table with collapsible frames on their back suitable for installation in electric trains, aircraft, and theaters.

The third mode of the process of this invention relates to multilayer blow molding which extrudes plural thermoplastic resins from a die head in a tubular form to create a multilayer parison with a substantially uniform wall thickness in every part, introduces said parison into a mold which is split into plural parts and open to receive said parison, and clamps said mold to perform blow molding which comprises forming sections different from one another in respect to one or more of the kind of resins, number of layers, and thickness of layers in the circumferential direction of said parison and at the same time varying the wall thickness ratio of the resin layers in each of said sections in the direction of the extrusion of said parison.

A multilayer parison extruded by this mode of blow molding has two sections and at least two resin layers, outer and inner, varying in the wall thickness ratio in the direction of the extrusion of the parison. Designating the ratio of the wall thickness of the inner layer to that of the outer layer in one section as $r_1$ and the ratio in the other section as $r_2$ in any one cross section in the longitudinal direction of the parison, it is recommended to perform the extrusion in such a manner as to maintain the product of $r_1$ and $r_2$ approximately unity.

An apparatus to practice the third mode of the process is a modification of the apparatus for the aforesaid second mode of the process and is constructed by forming two equal sections (p=2), each with a circumferential width of 180°, in the multiple annular passage, dividing said multiple annular passage into an array of passages and a resin joint for combining the resins flowing through the the array of passages, and installing a ring-shaped passage width control valve beneath each passage, said control valve being capable of moving back and forth in the direction at a right angle to that of the flow of molten resins and changing the width of the lower end of each passage whereby changing the wall thickness ratio of the resin layers in each section of the parison in the direction of extrusion.

Hence, a multilayer blow molding apparatus thus constructed makes it possible to extrude plural thermoplastic resins through a die head in a tubular form to create a multilayer parison with a substantially uniform wall thickness in every part and blow mold said parison into a hollow article in which there are sections different from one another in respect to one or more of the kind of resins, number of layers, and thickness of layers along the circumference in a cross section of the molded article, the wall thickness ratio of the resin layers in each of said sections varies along the longitudinal wall of the molded article, and the changes in the thickness ratio are designed to occur to satisfy the performance requirements of each section of the molded article.

The third mode of the multilayer blow molding process and the apparatus make it possible not only to extrude multilayer parisons with various patterns of m resins, n layers, and 2 circumferential sections and mold multilayer hollow articles, but also to change the ratio of the wall thickness of the innermost layer to that of the outermost layer in each section along the longitudinal wall of the parison by actuating the passage width control valves installed in the die head and mold hollow articles with their properties changing markedly from part to part. In simultaneous blow molding of plural hollow articles from one multilayer parison with vertical installation of plural cavities in a mold, this capability of changing the wall thickness ratio along the longitudinal wall allows installation of cavities alternately facing the opposite direction and this arrangement of the cavities in turn distributes the clamping force uniformly throughout the mold at the time of clamping and improves markedly the operating efficiency of blow molding.

The fourth mode of the process of this invention relates to multilayer blow molding which extrudes plural thermoplastic resins from a die head in a tubular form to create a multilayer parison with a substantially uniform wall thickness in every part, introduces said parison into a mold which is split into plural parts and open to receive said parison, and clamps said mold to perform blow molding which comprises forming sections different from one another in respect to one or more of the kind of resins, number of layers, and thickness of layers in the circumferential direction of the parison in at least one of resin layers constituting said multilayer parison and at the same time varying the width of each section in the direction of the extrusion of the parison.

In the molding of multilayer parisons of m resins, n layers, and p sections by this blow molding process, it is desirable to practice the process in such a manner as to produce different patterns of change in the width of each section in the direction of the extrusion of the parison in any one of the resin layers. The creation of multilayer parisons in this manner has an advantage in that it allows selection of proper kinds of resins to meet the performance requirements in the cases where the intended molded articles are polyhedrons of curved surfaces with edges forming complex curves and each surface of the articles must have properties of its own.

An apparatus to practice the fourth mode of the process is a modification of the apparatus for the aforesaid second mode of the process and is constructed by dividing the multiple annular passage into an array of passages and a resin joint for combining plural resins flowing through the array of passages and installing sectional width controllers between the two, said sectional width controllers being composed of funnel-shaped hemispherical shells in the number corresponding to that of resin layers n and tongue-shaped flapping nails attached to the outer surface of each hemispherical shell near the lower end of each partition wall constituting the sectional boundary in the aforesaid multiple annular passage and functioning to change the width of each section and form a multilayer parison changing in the sectional width in the direction of the extrusion of the parsion.

The sectional width controller to be installed between the array of passages and the resin joint may be formed integrally with one of the two or separately from the two.

The multilayer blow molding apparatus thus constructed makes it possible to extrude plural thermoplastic resins through a die head in a tubular form to create a multilayer parison with a substantially uniform wall thickness in every part and blow mold said parison into a hollow article in which there are sections different from one another in respect to one or more variables of the kind of resins, number of layers, and thickness of layers in the cross section of the molded article along the circumferential wall, the width of each section in each resin layer changes along the longitudinal wall of the molded article, and each section meets its respective performance requirements.

As with the first mode of the process and apparatus, the fourth mode of the process and apparatus make it possible not only to extrude multilayer parisons with a variety of patterns of m resins, n layers, and p sections, but also to cause changes in the sectional width along the longitudinal wall of the parison with the aid of the sectional width controllers installed in the die head and blow mold hollow articles with patterns of marked changes in properties in both circumferential and longitudinal directions, which allows respective sections of hollow articles to perform sufficiently in heat resistance, water resistance, thermal insulation, sound insulation, and abrasion resistance in particular end uses and contributes to improve the product performance of the hollow articles.

BRIEF DESCRIPTION OF THE DRAWINGS

FIGS. 21 to 23 illustrate the flow of molten resins inside the resin distribution tubes equipped with branch-off points and junctions.

DETAILED DESCRIPTION OF THE PREFERRED EMBODIMENTS

The multilayer blow molding process, apparatus, and hollow articles of this invention are described in detail with reference to the accompanying drawings and examples.

Example 1

Figure 1:
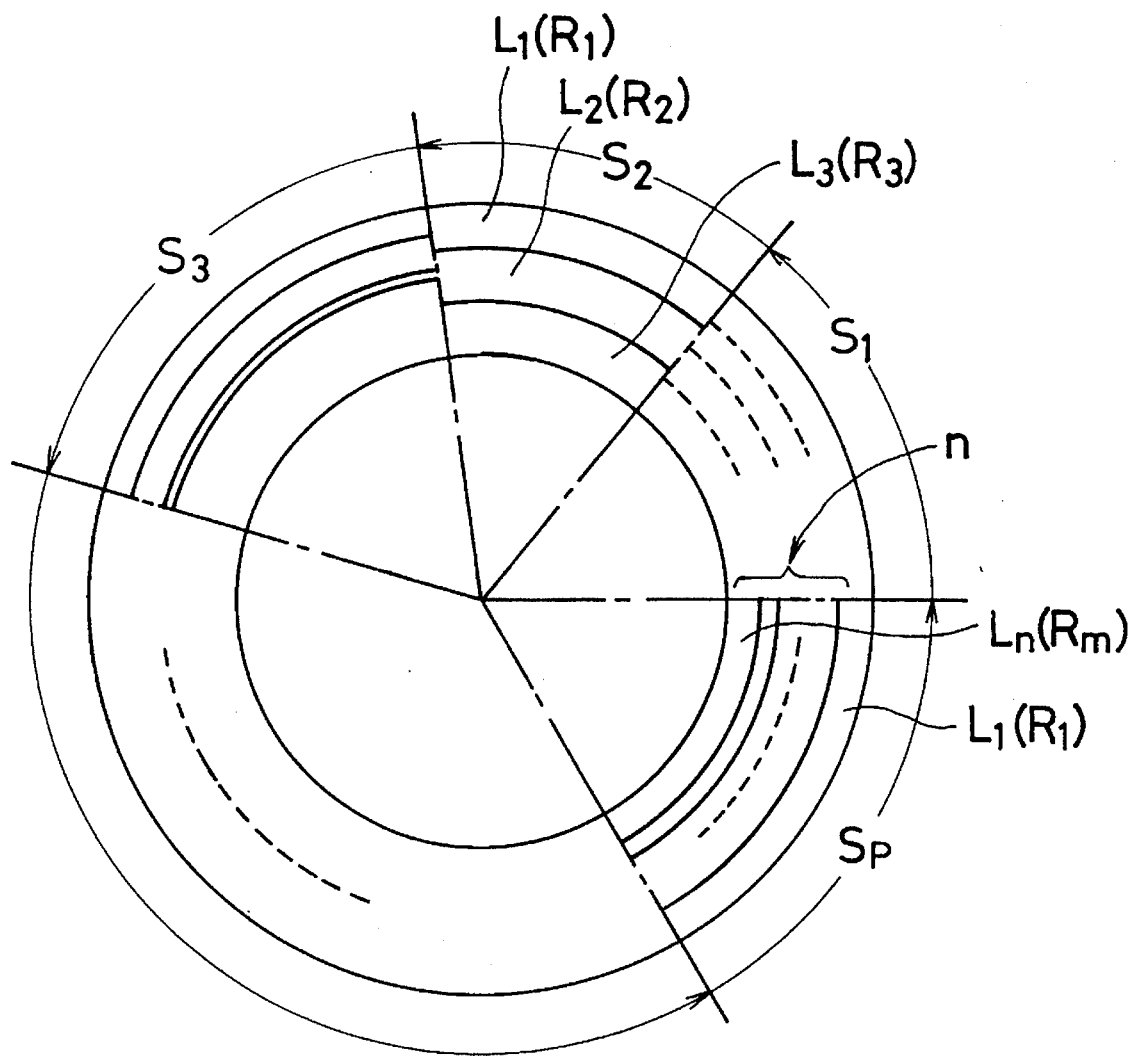
FIG. 1 is a schematic illustration of the cross section of a multilayer parison obtained in Example 1 by the first mode of the multilayer blow molding process and apparatus of this invention.

This example relates to the first mode of the multilayer blow molding processs of this invention, apparatus, and hollow articles. FIG. 1 conceptually shows a multilayer parison $P_1$ created by the process and apparatus in cross section. The multilayer parison $P_1$ has an m-resin-n-layer-p-section structure containing m kinds of resins $R_1, R_2, \ldots,$ and $R_m$, n layers $L_1, L_2, \ldots,$ and $L_n$, and p sections $S_1, S_2, \ldots,$ and $S_p$ in the circumferential direction of the parison. The cross section is divided into p sections in FIG. 1 and, in each section, the maximum number of resin layers is n and the maximum number of combinations of resins is m which is equal to or less than n. The multilayer parison $P_1$ in FIG. 1 is shown to have a uniform thickness in its cross section all around the circumference, but the thickness may be changed in any one or more of the sections $S_1, S_2, \ldots,$ and $S_p$ as needed. Also, the number of resin layers n is shown to vary from section to section in FIG. 1, but it is allowable to form the resin layers $L_1, L_2, \ldots,$ and $L_n$ in concentric circles around the circumference of the parison and form a necessary number of sections $S_1, S_2, \ldots,$ and $S_p$ in each of these resin layers.

It is necessary for all of the sections $S_1, S_2, \ldots,$ and $S_p$ formed in the circumferential direction of the parison to have a width corresponding to a central angle of 45° or more in at least one of the resin layers $L_1, L_2, \ldots,$ and $L_n$ and to extend in the longitudinal direction of the parison. This advantageously prevents a certain section of said parison from going out wholly from the mold cavity during clamping of the mold and becoming totally missing in the blow-molded article.

Figure 2:
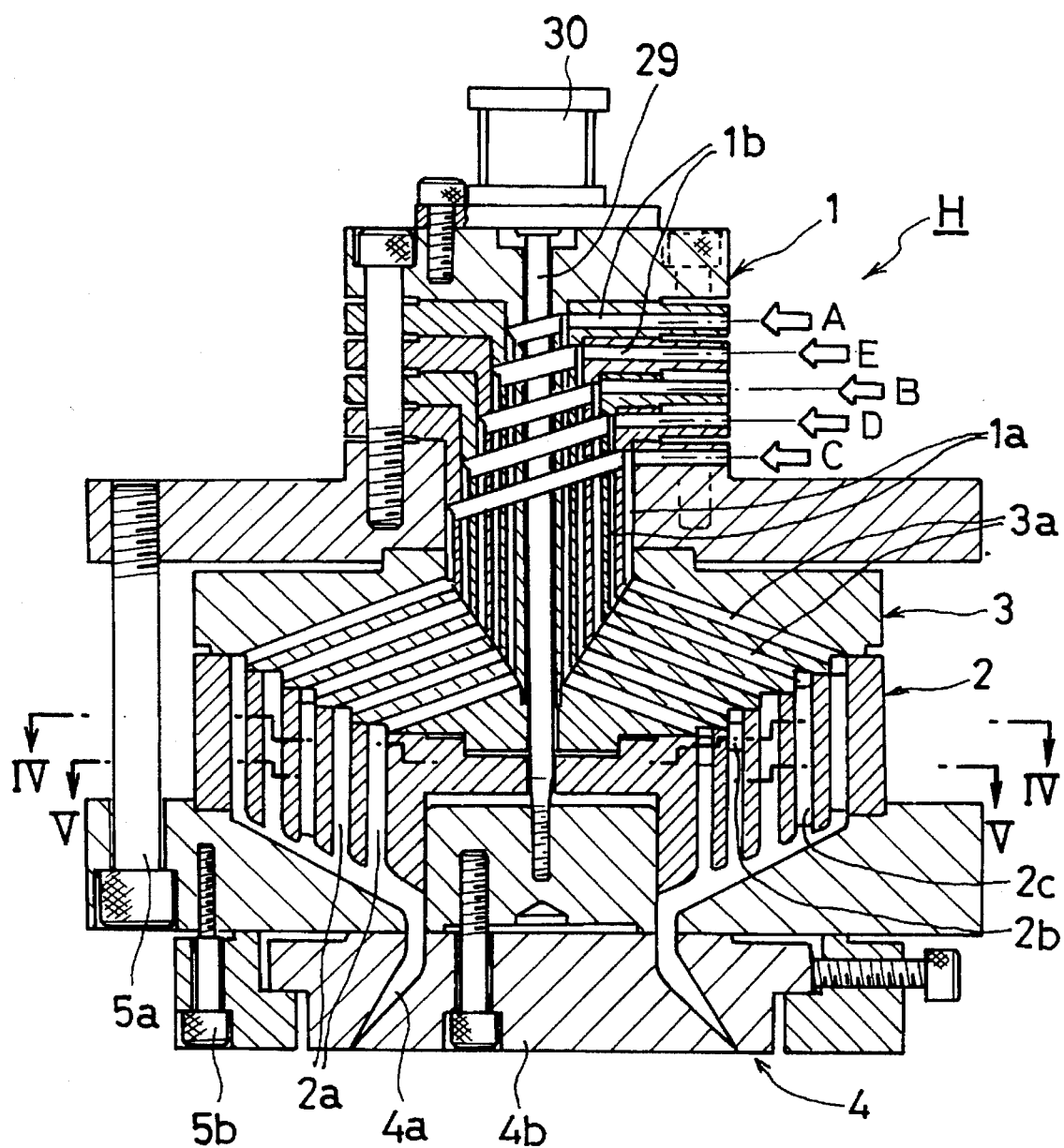
FIG. 2 is an illustration in section of a multilayer blow molding apparatus for the practice of the first mode of the process of this invention.
Figure 3:
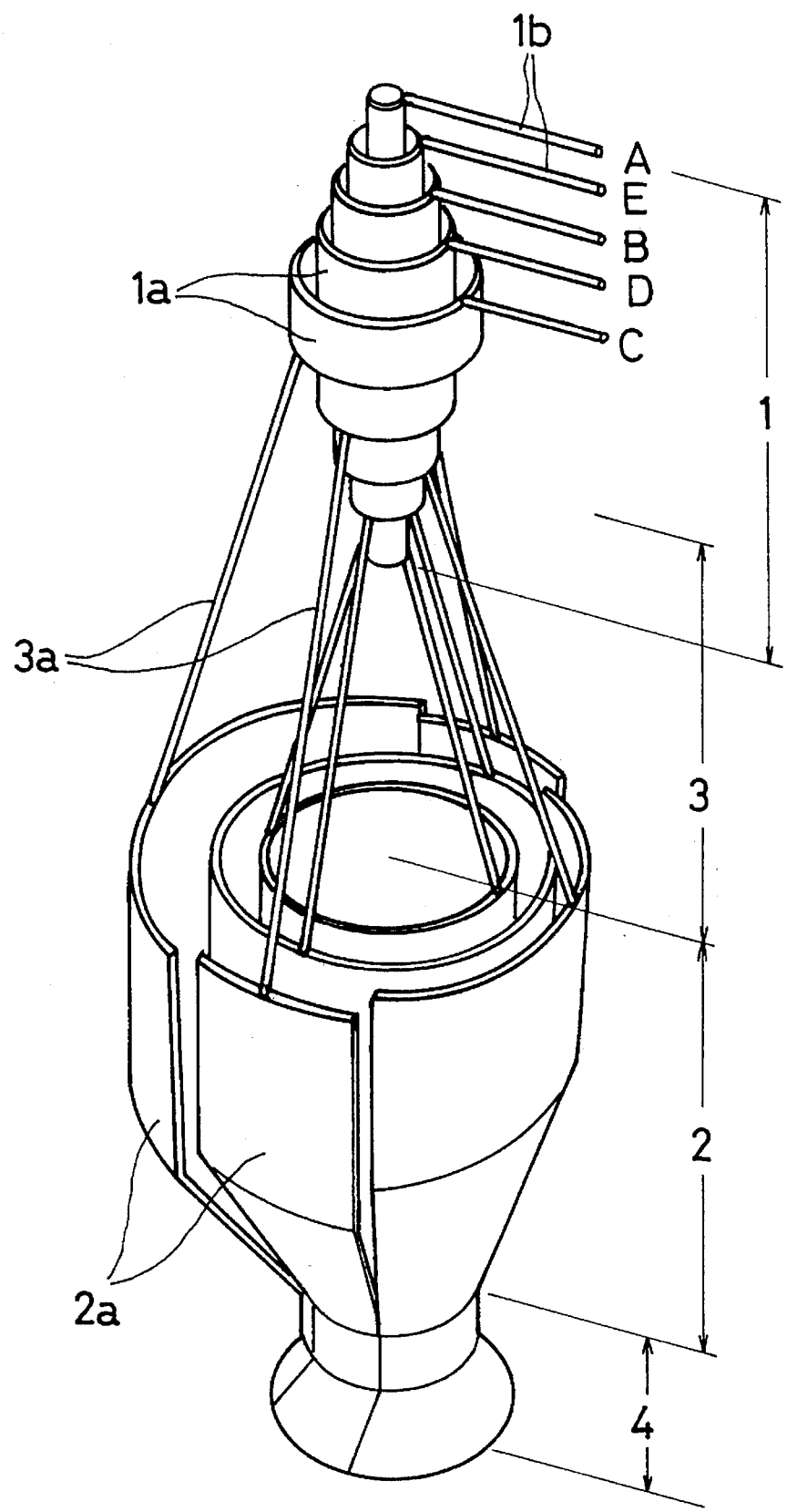
FIG. 3 is an illustration of the singled-out flow of resins inside the molding apparatus of FIG. 2.

A sectional view of an apparatus useful for the practice of the first mode of the multilayer blow molding process of this invention is presented in FIG. 2 and the flow of molten resins inside the apparatus is singled out and illustrated in FIG. 3.

The die head of this molding apparatus is composed of a multitorus 1 which spreads out five kinds of molten resins A, B, C, D, and E extruded from five extruders (not shown) through resin inlet tubes 1b into a concentric annular passage 1a, a lotus root 2 which constitutes passages 2a for forming sections of different kinds of resins in a multilayer parison in the circumferential direction of the parison, an octopus 3 which constitutes passages 3a connecting the multitorus 1 and the lotus root 2 and directs the molten resins A, B, C, D, and E earlier spread out into the five-fold concentric annular passage 1a in the multitorus into the passages 2a formed in a pattern of m resins, n layers, and p sections by the lotus root 2, and a nozzle 4 which is located beneath the lotus root 2 and possesses a slit 4a which extrudes into a tubular multilayer parison $P_1$ the molten resins A, B, C, D, and E which have passed through the passages 2a in the pattern of m resins, n layers, and p sections in the lotus root 2 and joined beneath the passages 2a.

Figure 4:
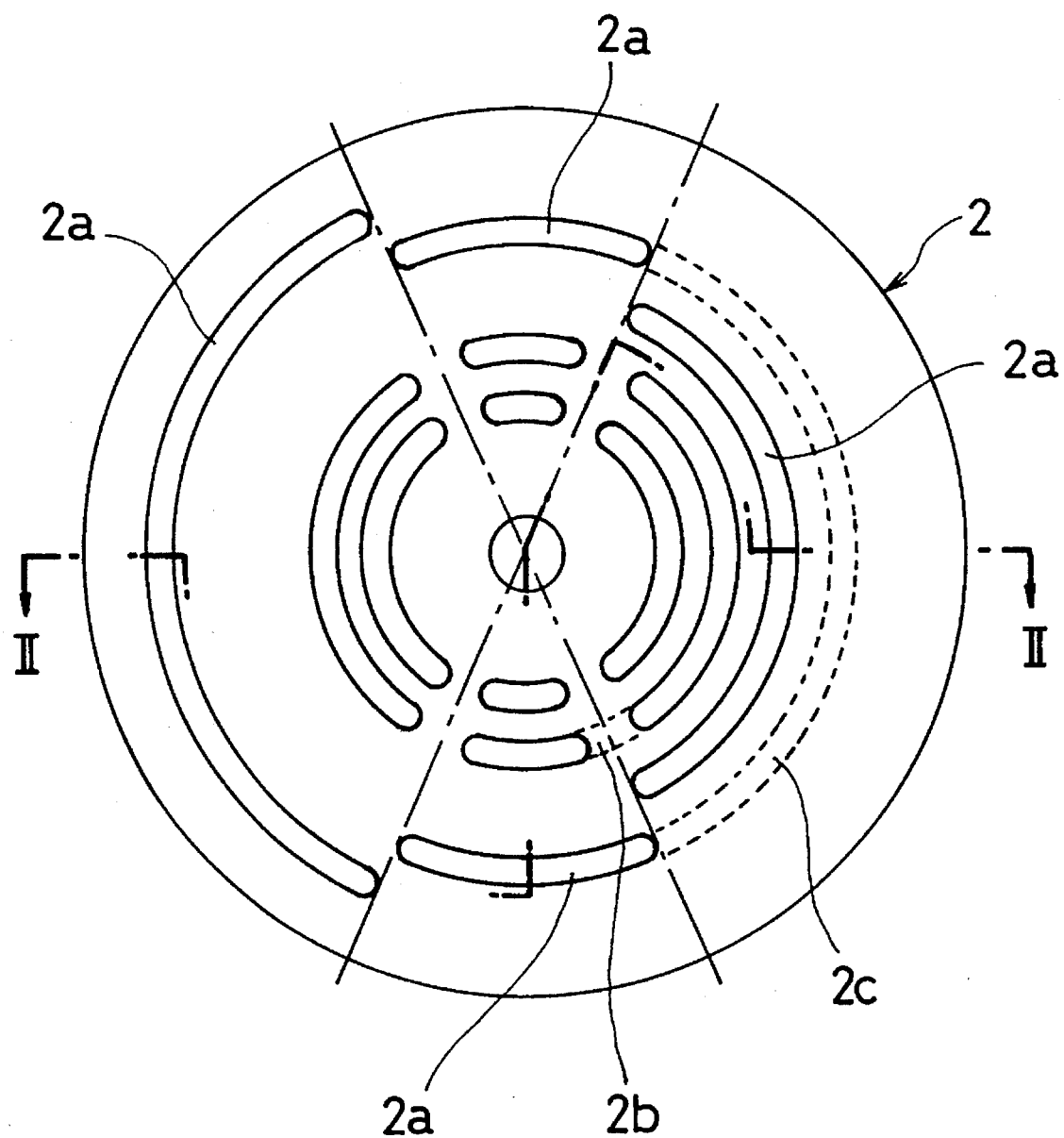
FIGS. 4 and 5 are respective cross sections along the lines IV—IV and V—V of the lotus root of FIG. 2.
Figure 5:
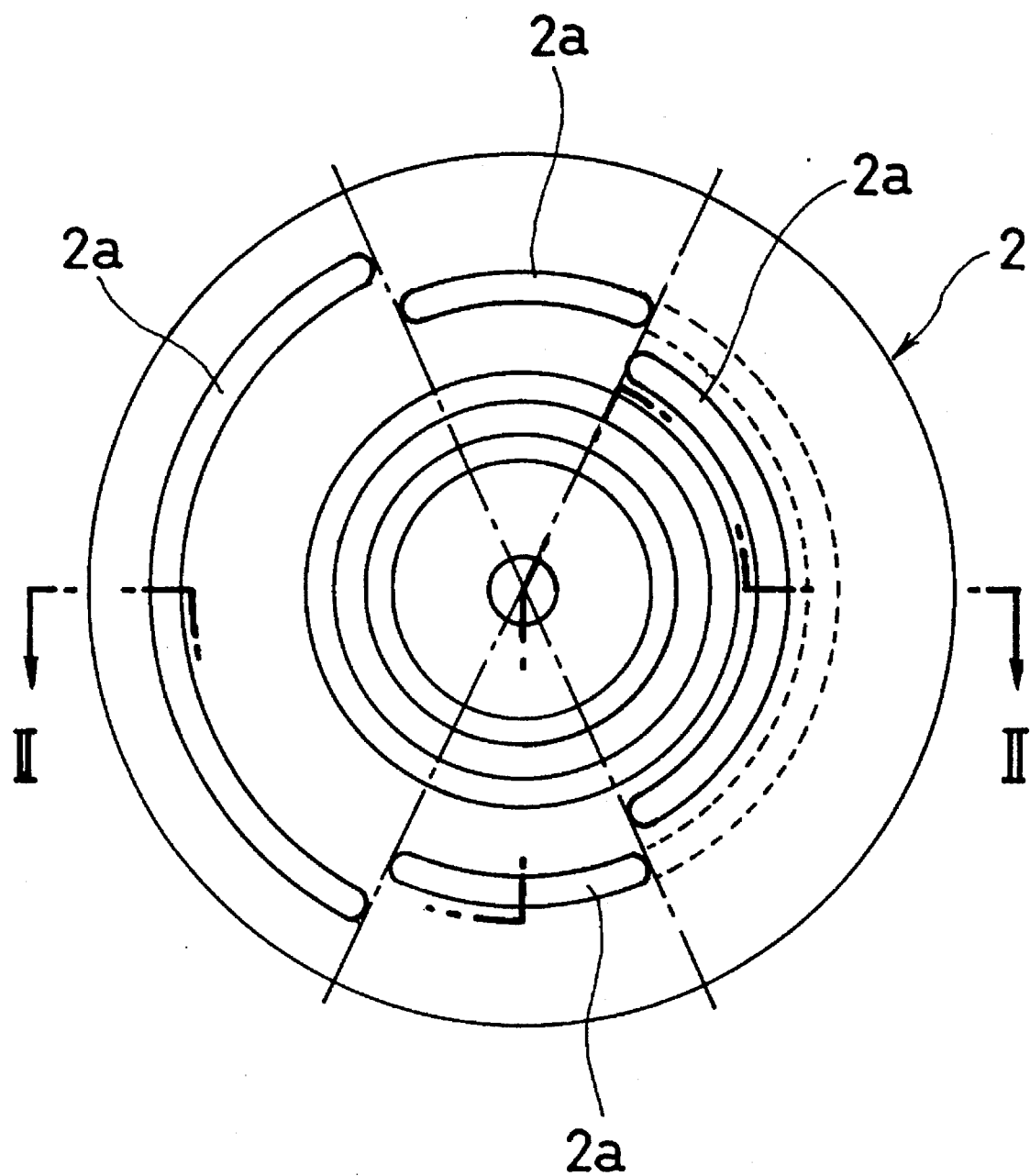

Referring to FIGS. 4 and 5 which are cross sections along the lines IV—IV and V—V of FIG. 2 (the cross sections of the lotus root in FIG. 2 are those along the line II—II in FIGS. 4 and 5), the aforesaid lotus root 2 in Example 1 has a plurality of passages 2a in the form of a circular arc or a slit for the molten resins and there are provided two kinds of bridges, 2b and 2c, which serve to connect the ends of each passage 2a lying on the same circumference. The bridge 2b is provided for the purpose of mechanically connecting various circular arc- and slit-shaped passages 2a in the lotus root 2 to prevent them from becoming loose. In order to minimize the traces of disturbance of the flow of resins by the bridge 2b in the molded products, the bridge 2b must be made as narrow and short as possible. Thus, the bridge 2b is no longer present in FIG. 5 which shows the cross section along V—V in FIG. 2. On the other hand, the other bridge 2c is provided specifically to prevent the flow of resins. For example, the bridge 2c is provided in the passages 2a for the resins B, C, and D in FIG. 2 and it extends in a circular arc as shown in broken lines in FIG. 4 and also extends roughly along the whole length of the lotus root 2 as shown in FIG. 2 in order to prevent the flow of resins with certainty.

The part numbered 29 in FIG. 2 is a parison controller shaft driven by a hydraulic cylinder 30 and its up-and-down movement causes the die core 4b of the nozzle 4 to move up and down and control the die slit 4a through which a multilayer parison is extruded.

In Example 1, the multitorus 1, lotus root 2, octopus 3, and nozzle 4 constituting the aforesaid die head H are provided as independent parts which can be disassembled and reassembled and they are put together by means of a bolt 5a which connects the multitorus 1 and the lotus root 2 with the octopus 3 inserted between the two and a bolt 5b which connects the nozzle 4 and the lotus root 2. With the multilayer blow molding apparatus of Example 1 on hand, it becomes possible to keep a stock of a variety of shapes for the lotus root 2 and occasionally the octopus 3, select a suitable lotus root and occasionally an octopus required to form a multilayer parison $P_1$ of a desired m-resin-n-layer-p-section structure, incorporate them in the die head H, and create a multilayer parison $P_1$ which can satisfactorily meet various customer needs for hollow molded articles.

Figure 6:
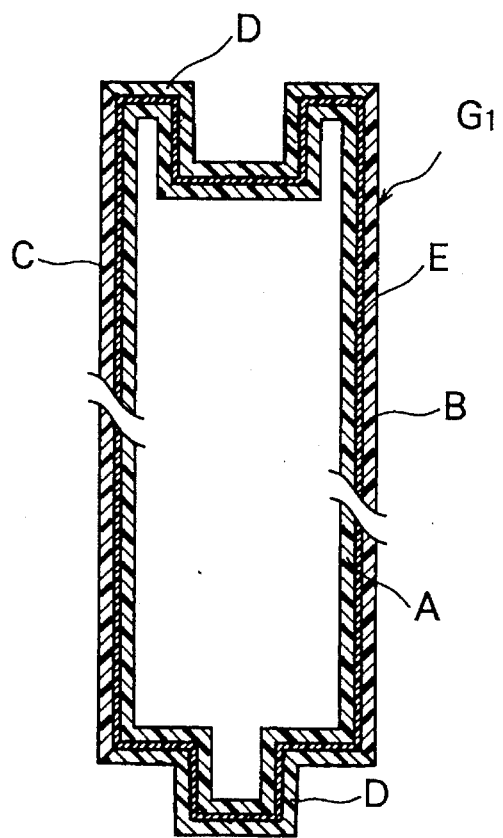
FIG. 6 is a schematic illustration of the cross section of a boiler-room door blow-molded by the apparatus of FIG. 2.

A trial was made in Example 1 to blow mold a multilayer article $G_1$ which has a structure shown in FIG. 6 and can function as a heat- and sound-insulating boiler-room door.

Figure 7:
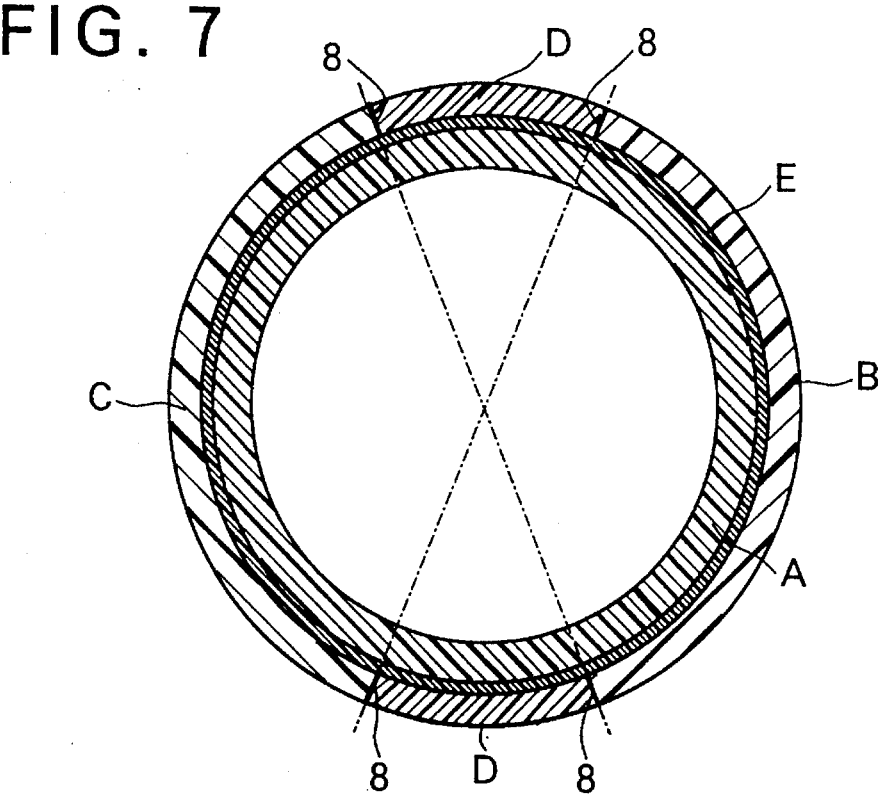
FIG. 7 is a schematic illustration of the cross section of a multilayer parison extruded from the apparatus of FIG. 2.

Glass fiber-reinforced polypropylene, extremely easy to blow mold with stregnths at relatively high levels and at the same time economical, was used as resin A for the structural material of the door. Glass fiber-reinforced polyphenylene sulfide with excellent resistance to heat, hot water, chemicals, and oils was used as resin B for the inner surface of the door which is directly exposed to an atmosphere containing high-temperature steam, water vapor, and oil drops. Acrylonitrile-butadiene-styrene copolymer (ABS) with a smooth, beuatiful, glossy surface was used as resin C to form the outer surface which is exposed to human eyes. Polyoxymethylene with good abrasion resistance and surface lubricity was used as resin D to form upper and lower ends of the door which are placed in contact with door rails. In addition, adhesive resin E was inserted between two resins which are difficult to adhere to each other by themselves. These resins were fed by extruders (not shown) and put through the die head H in FIG. 2 to create a multilayer parison $P_1$ which is shown in cross section in FIG. 7. The parison in question has five kinds of resins (A, B, C, D, and E), three layers (inner, middle, and outer), and four sections in the outer layer (two sections of resin D each with a circumferential width of 45°, one section of resin B with a circumferential width of 135°, and one section of resin C with a circumferential width of 135°).

Figure 8:
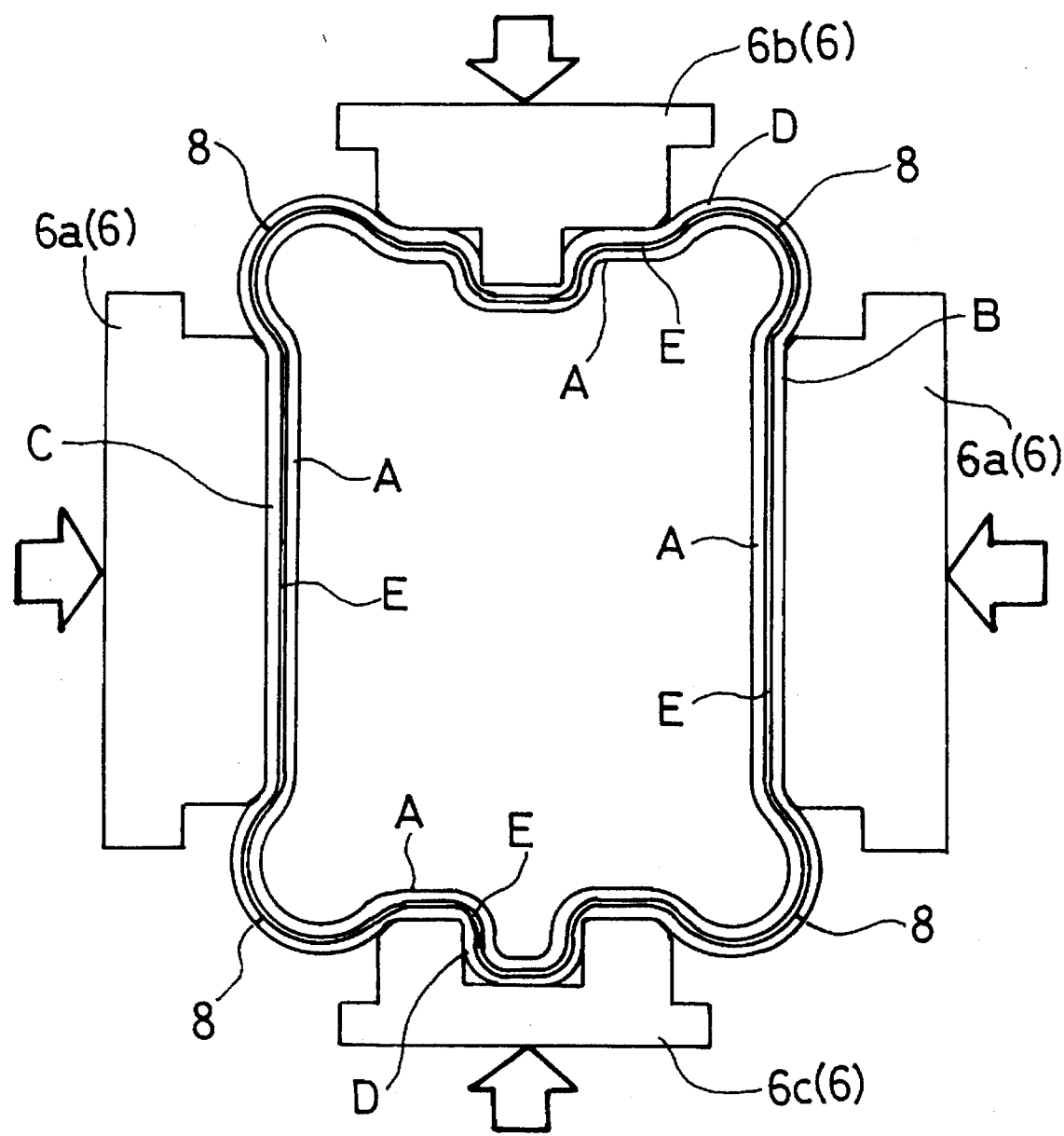
FIGS. 8 and 9 are illustrations of a four-part mold being clamped in the blow molding of a multilayer parison.
Figure 9:
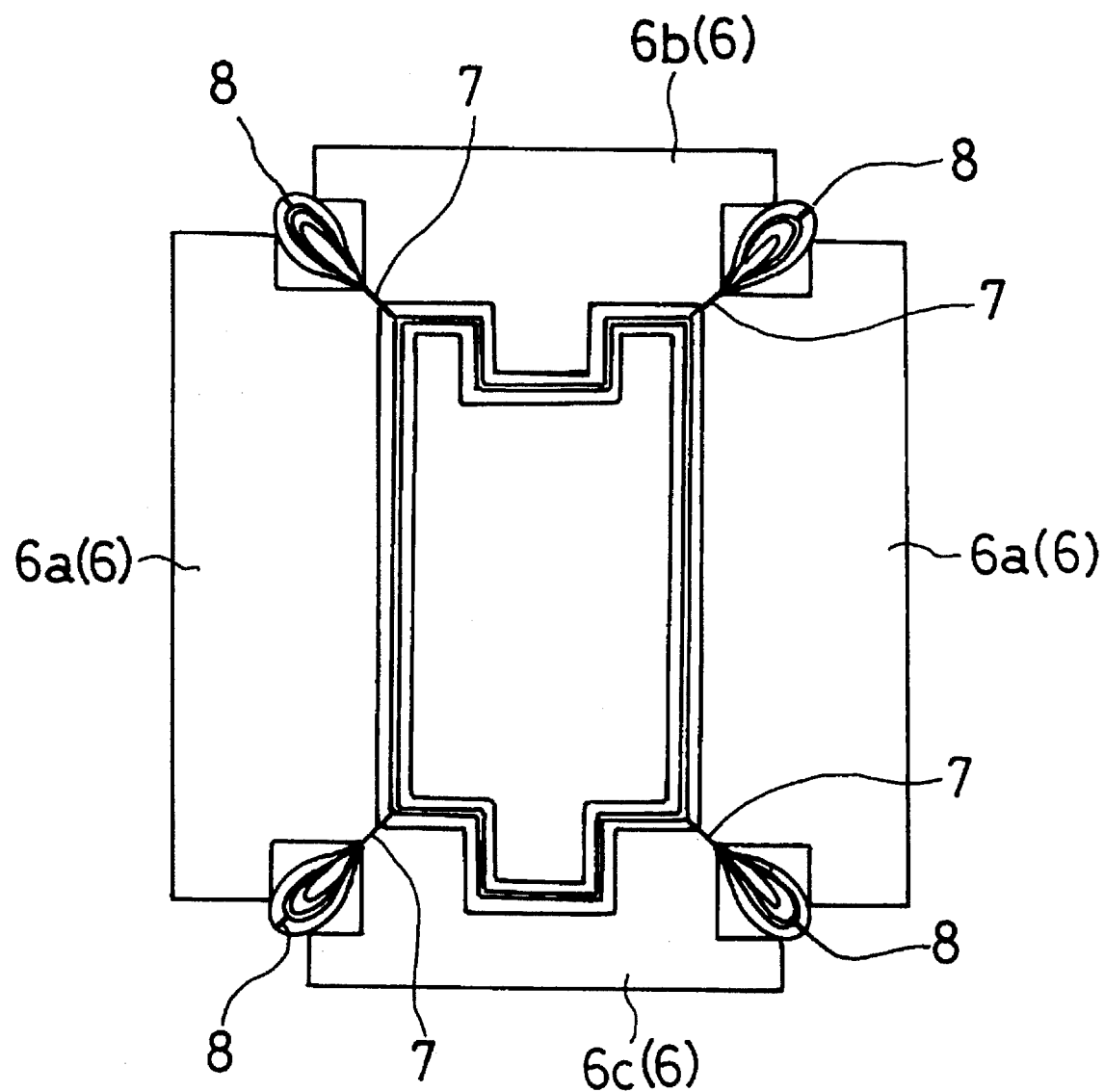

The multilayer parison $P_1$ was then blown in the usual manner in a mold placed immediately below the die head H to produce a multilayer hollow article $G_1$ (boiler-room door). The mold 6 used here is divided into four parts, two 6a's, 6b, and 6c, corresponding to the four sections of different kinds of resins as shown in FIGS. 8 and 9. When the mold with these four parts is clamped to perform blow molding, the areas 7 where the mold parts 6a, 6b, and 6c meet together pinch off the boundaries 8 of the aforesaid sections of different kinds of resins and match the boundaries of the remaining sections along the angular edges of the molded article. In the blow-molded multilayer article $G_1$ thus produced, the two sections of resin D forming the upper and lower edges occupy at least ⅛ of the total length of the walls in cross section. The use of four-part mold 6 here has the following advantage. In blow molding with a conventional two-part mold, the concave parts on both sides of the upper edge in the cross section of a molded article lead to the formation of undercuts to interfere with the opening of the mold parts. On the other hand, the four-part mold 6 shown in FIGS. 8 and 9 can prevent the formation of such undercuts.

Figure 10:
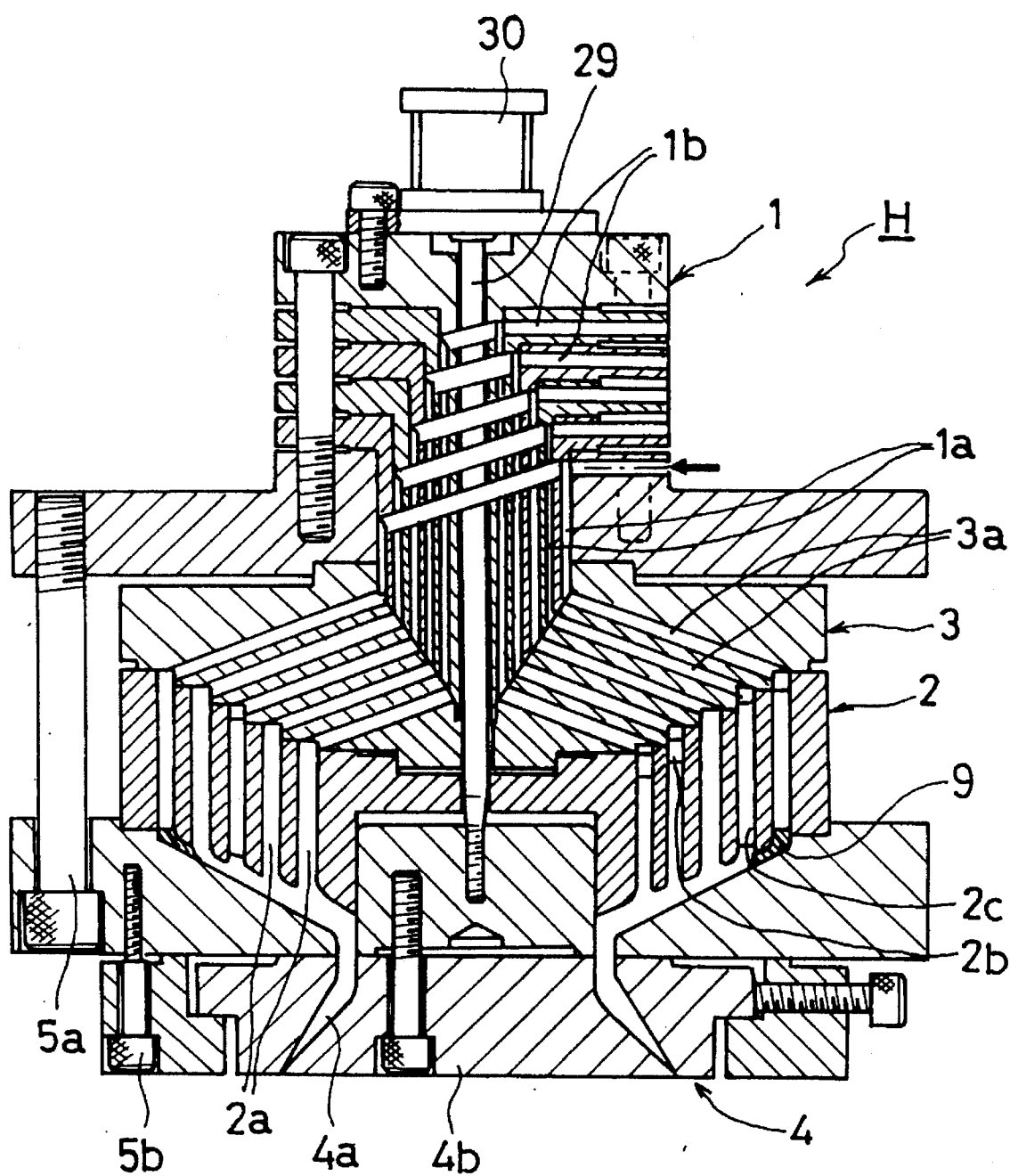
FIG. 10 is a schematic illustration of the multilayer blow molding apparatus of FIG. 2 to which blind rings are attached.
Figure 11:
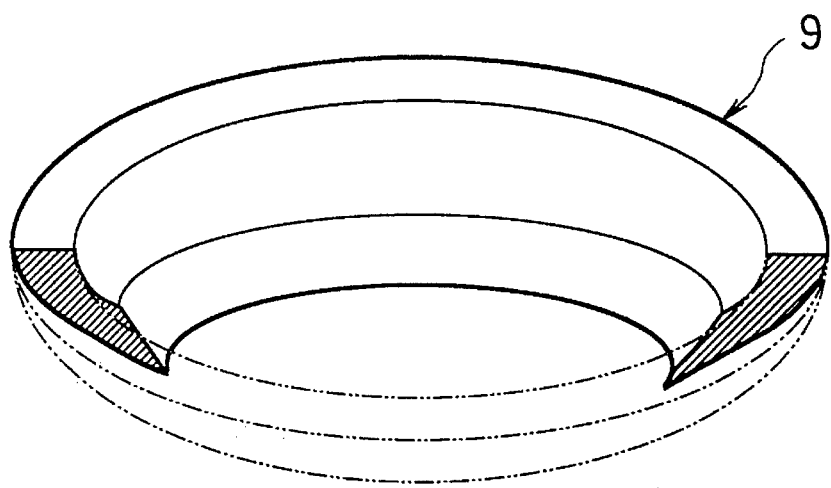
FIG. 11 is a perspective view of the blind ring of FIG. 10.

The multilayer blow molding apparatus shown in FIG. 2 fitted with the die head H designed to extrude a multilayer parison $P_1$ of m resins, n layers (n≧3), and p sections can be utilized to create a multilayer parison $P_1$ of m' resins, n' layers, and p' sections (m', n', p' are respectively an integer of 2 or more and m≧m', n>n', and p≧p') by blocking the passages for the outer (n–n') layers out of the passages 2a for the whole n layers with the attachment of detachable blind rings 9 to the lower openings of said passages for (n–n') layers in the lotus root 2 as shown in FIG. 10. The blind ring is shaped like the one shown in FIG. 11, but not limited thereto. Any blind ring is satisfactory as long as it can block the lower openings of the passages corresponding to the outer (n–n') layers in the patterned passages 2a and it may be shaped like a circle or a circular arc. A die head H initially composed of multitorus 1, lotus root 2, and octopus 3 to extrude an n-layer parison $P_1$ can readily create a multilayer parison $P_1$ of less-than-n layers with the attachment of a blind ring 9. This allows the construction of a multipurpose multilayer blow molding apparatus.

Figure 12:
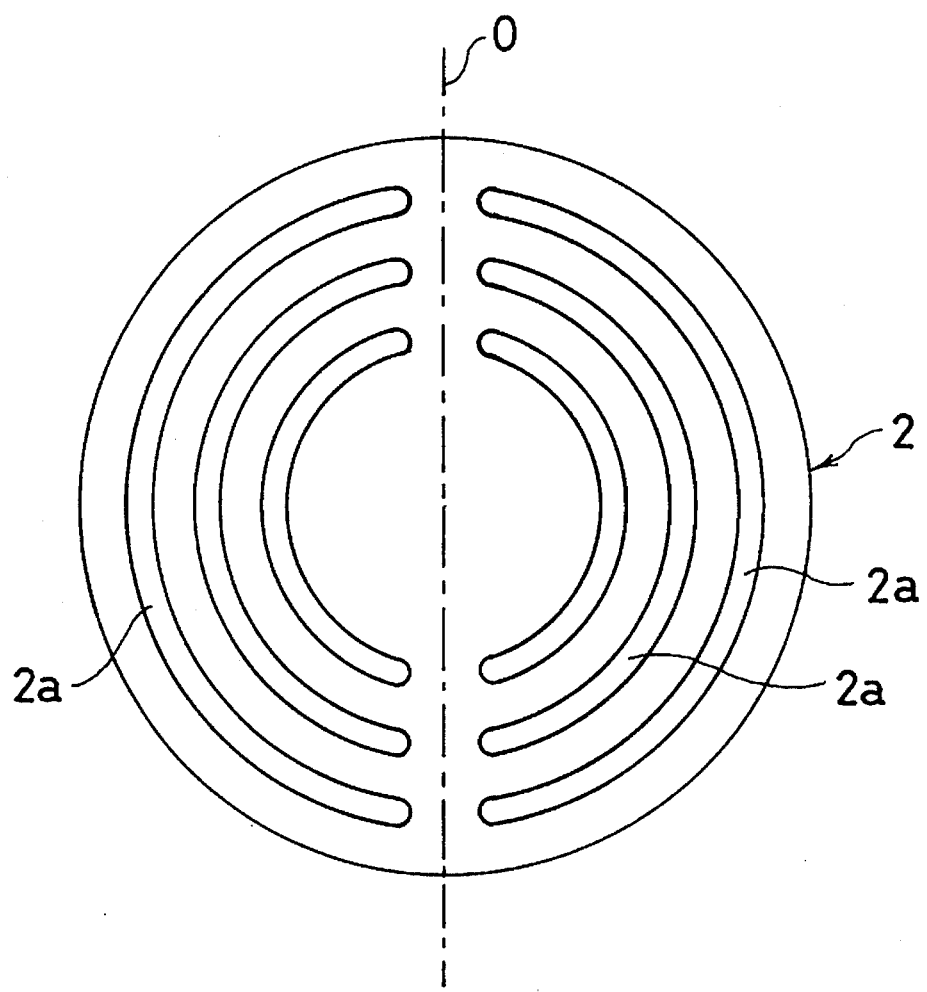
FIG. 12 is a plan view of a modification of the lotus root.
Figure 13:
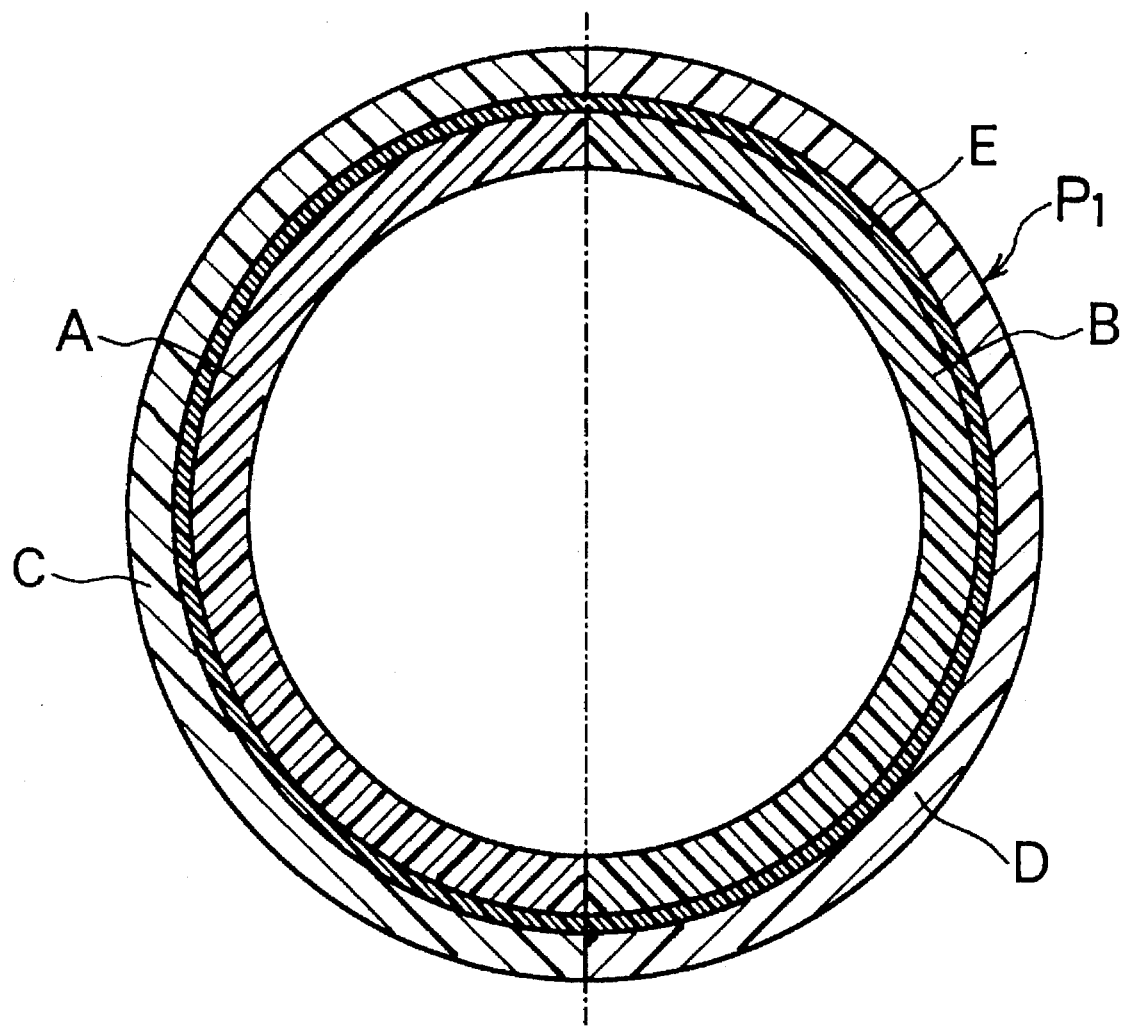
FIG. 13 is a schematic illustration of the cross section of a multilayer parison formed by the lotus root of FIG. 12.

A modification of the lotus root 2 is shown in FIG. 12. There are three passages 2a shaped like concentric semicircles on each side of the central line O. It is possible to extrude a multilayer parison $P_1$ shown in FIG. 13 with 5 resins, 3 layers, and 2 sections (each with a circumferential width of 180°) by replacing the aforesaid lotus root in FIG. 2 with the modification of FIG. 12 and feeding five kinds of molten resins. This modified lotus root can also create with ease a multilayer parison having three layers of three kinds of resins in one half and an apparent single layer of any one of the three kinds of resins in the other half or a multilayer parison of a half-multiple half-single layer structure. In this case, the same resin is fed to all three passages 2a for the formation of the apparent single-layer section to assure the uniform thickness of the multilayer parison in whole.

In Example 1, the passages 3a of the octopus 3 connect the concentric annular passage 1a and the lotus root 2 in good order, inside to inside and outside to outside, as shown in FIG. 3. However, there is no restriction to the way these passages are arranged. For example, molten resin C flowing through the outermost passage 1a may be led to the innermost passage 2a by making proper connection in the octopus 3. As for the octopus 3, five kinds of resins introduced into the multitorus 1 are all led to the patterned passages 2a in the lotus root 2. There is no limitation either here. It is allowable to block some of the passages 1a in the multitorus 1, provide passages 3a to connect only the remaining passages 1a with the patterned passages 2a in the lotus root 2, and distribute m kinds of molten resins (m being smaller now) to sections $S_1, S_2, \ldots,$ and $S_p$.

The multilayer blow molding apparatus of Example 1 was used to produce automotive bumpers $G_2$ having a variety of cross sections as shown in FIGS. 14 to 17.

Figure 14:
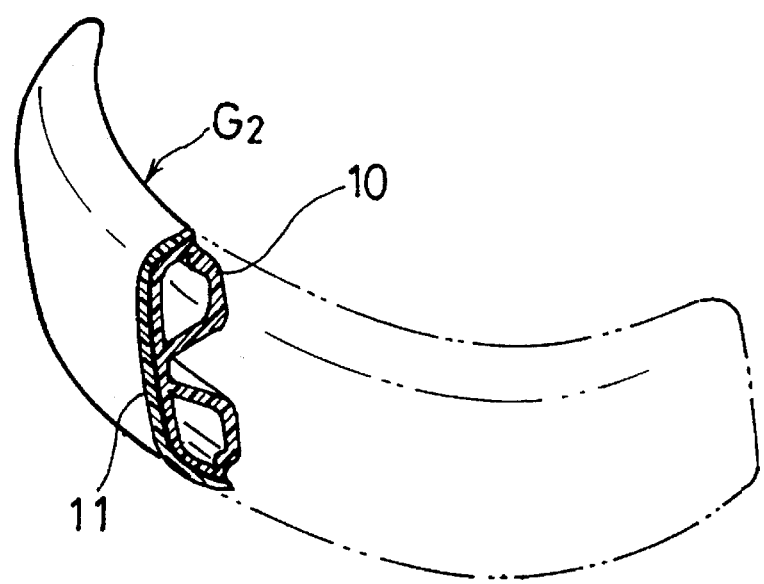
FIGS. 14 to 17 are schematic illustrations of the sections of automotive bumpers formed by the multilayer blow molding apparatus of Example 1.
Figure 15:
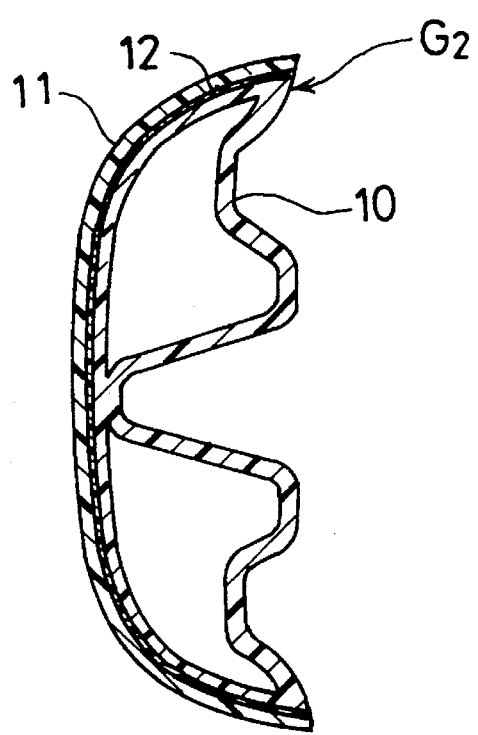
Figure 16:
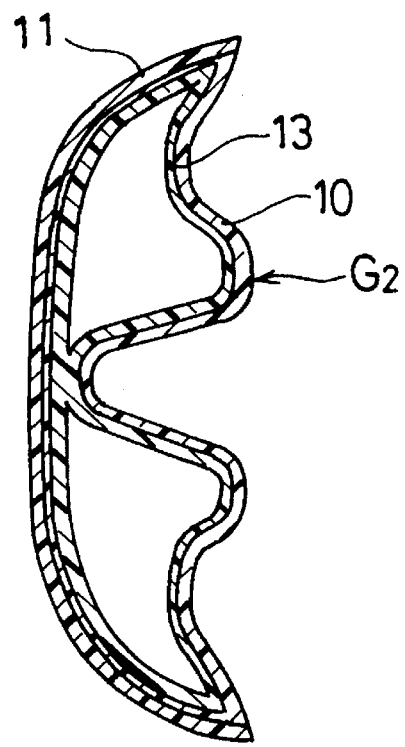
Figure 17:
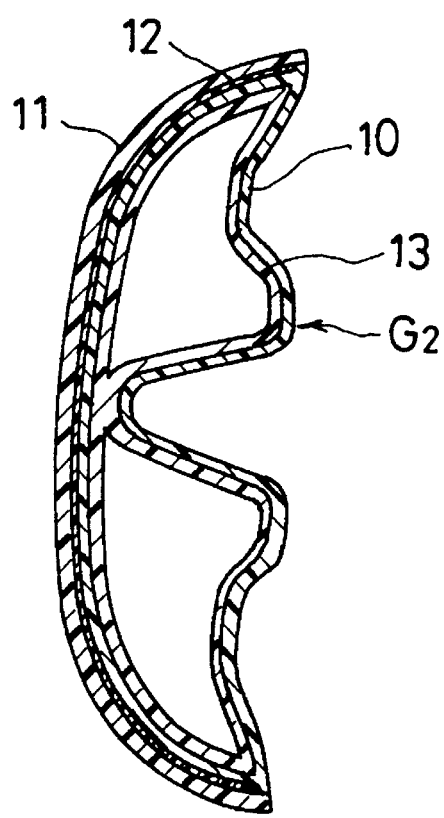

The automotive bumper $G_2$ in FIG. 14 is composed of a beam 10 which is a structural material with good strength and toughness in the form of a hollow rib to absorb the shock of a collision and a fascia 11 which is laminated over the whole front of the beam 10 in direct view of human eyes. In this example, the beam 10 is molded by glass fiber-reinforced polypropylene and the fascia 11 by ABS resin. The automotive bumper $G_2$ in FIG. 15 has an adhesive resin layer 12 between the beam 10 and the fascia 11 for stronger bonding of the two parts and is blow-molded from a multilayer parison of a 3-resin-3-layer-2-section pattern. The automotive bumper $G_2$ shown in FIG. 16 has a resin layer 13 composed of recycled resin inside the beam 10 and is designed for effective reuse of recycled resins. The automotive bumper $G_2$ in FIG. 17 has the same structure as the one in FIG. 16 with addition of an adhesive resin layer 12 and can be molded from a multilayer parison of a 4-resin-4-layer- 2-section pattern.

The multilayer blow molding of these automotive bumpers $G_2$ can markedly reduce the product ion cost and, in addition, minimize the thickness of expensive resins of good appearance in the visible fascia 11 in an integral molding operation with the resultant marked reduction in the requirement of the expensive resins and in the product cost. Another industrial merit is a realization of the use of recycled resins inside the beam 10 and other unexposed parts.

Example 2

Example 2 relates to the second mode of the multilayer blow molding process, an apparatus, and hollow articles of this invention.

Figure 18:
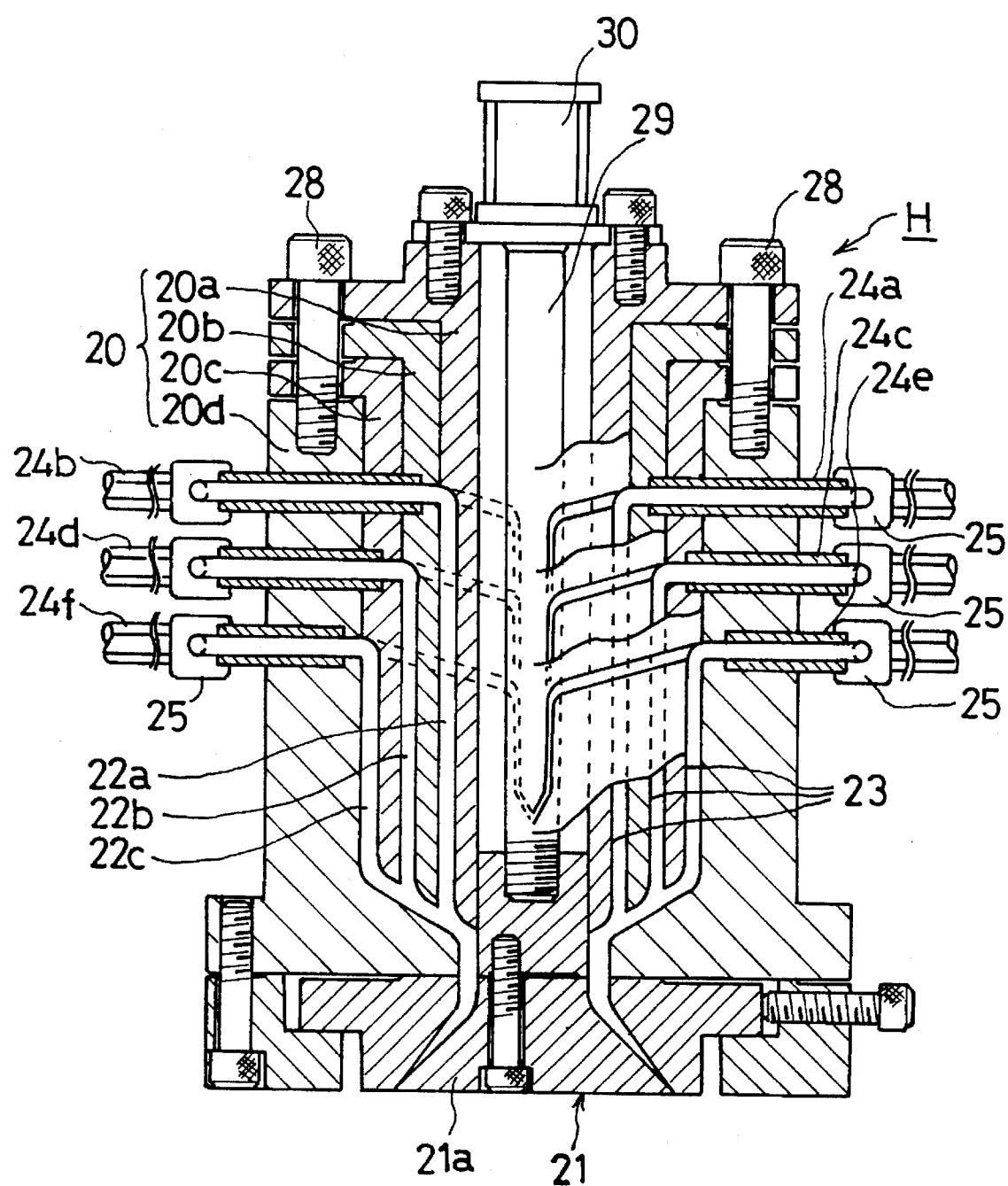
FIG. 18 is a schematic illustration in section of a multilayer blow molding apparatus for the practice of the second mode of the process of this invention used in Example 2.
Figure 19:
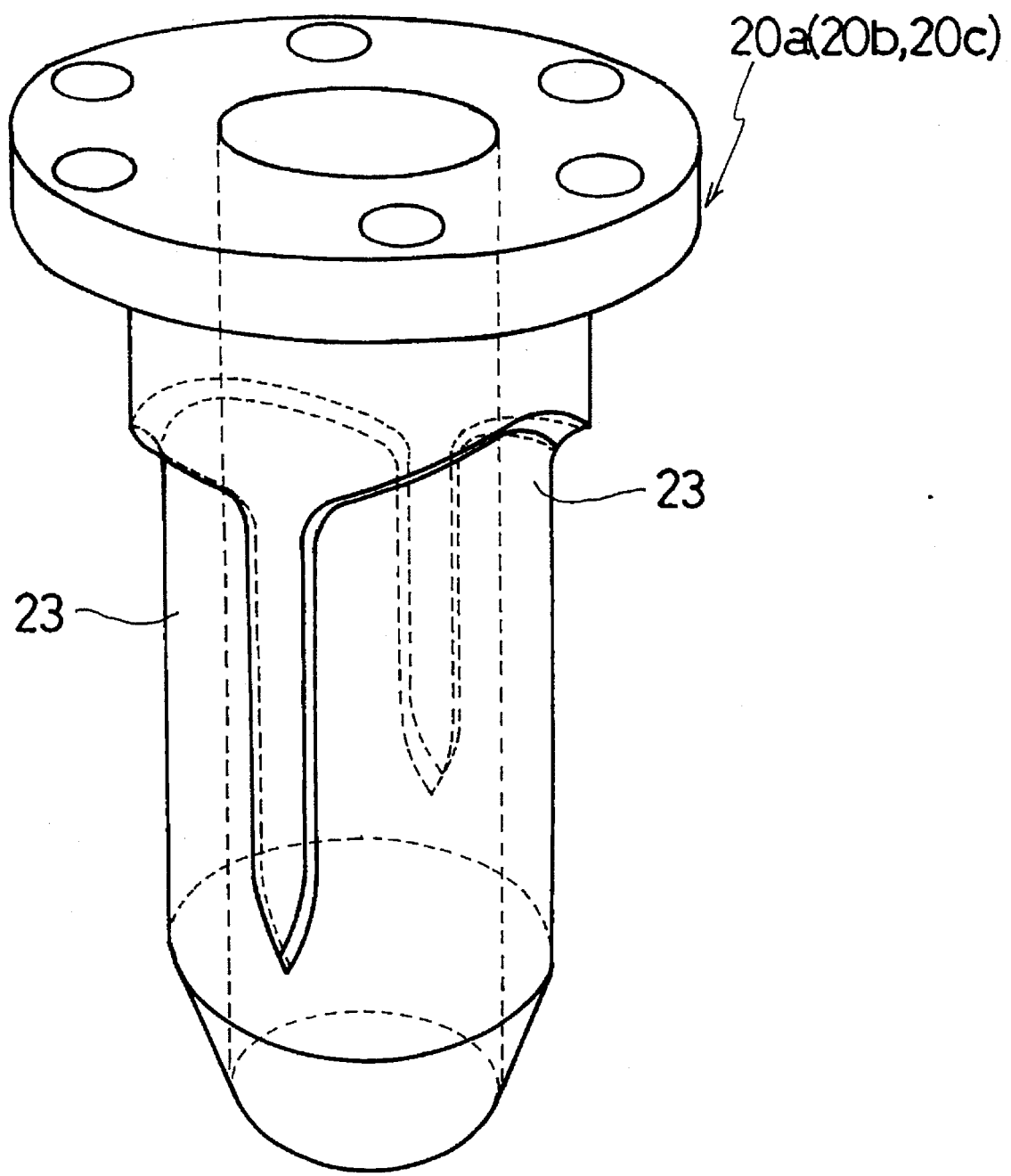
FIG. 19 is a perspective view of a passage-forming tube of FIG. 18.
Figure 20:
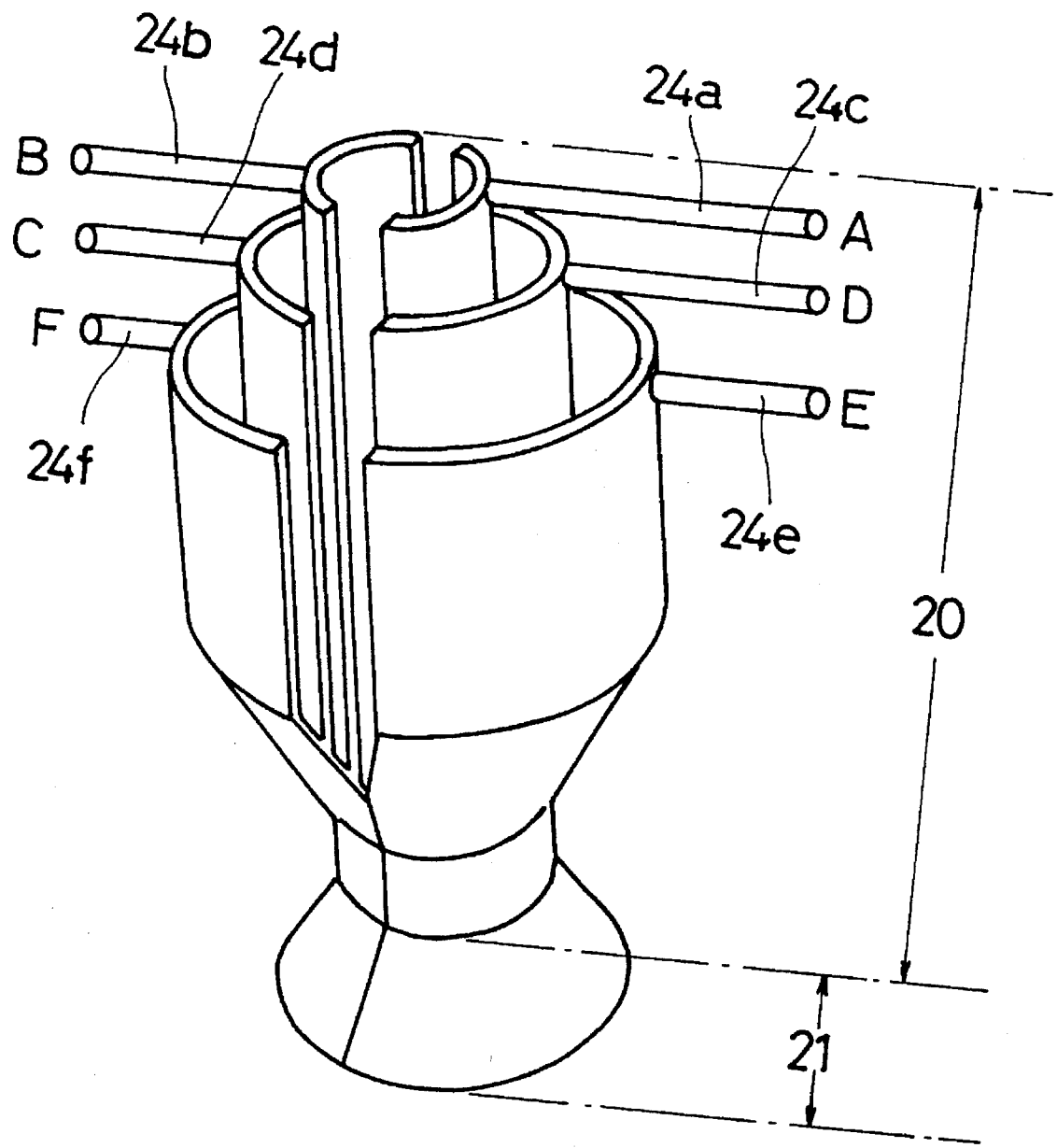
FIG. 20 is an illustration of the singled-out flow of resins inside the molding apparatus of FIG. 18.

The multilayer blow molding apparatus to practice the second mode of the process is basically as illustrated in FIGS. 18 and 19. In the extrusion of a multilayer parison $P_2$, let m designate the number of kinds of resins (m is an integer and ≧2), n the number of layers (n is an integer of 1 or more and is 2 or more in one or more sections), and p the number of sections (p is an integer and ≧2) formed in the circumferential direction and different from one another in respect to one or more of the kind of resins, number of layers, and thickness of layers. The die head H is composed of a multiple annular passage 20 which is constructed by putting an array of passage-forming tubes in the number corresponding to that of layers n or tubes 20a, 20b, and 20c in this example where n=3 and a shell 20d together and a nozzle 21 which is attached to the lower end of the multiple annular passage 20 and extrudes a multilayer parison $P_2$. Slots 23 provided on the outer walls of the passage-forming tubes 20a, 20b, and 20c in the number corresponding to that of sections p (p=2 and the circumferential width is 180° in Example 2) form passages 22a, 22b, and 22c for the molten resins in conjunction with the inner walls of their respective outer neighbors 20b, 20c, and the shell 20d. The tips of extruders (not shown) in the number corresponding at least to the number of kind of resins m are connected to the upper ends of the passages 22a, 22b, and 22c in the aforesaid multiple annular passage 20 by means of the resin distribution tubes 24a, 24b, 24c, 24d, 24e, and 24f. The flow of the molten resins is singled out and shown in FIG. 20.

Figure 21:
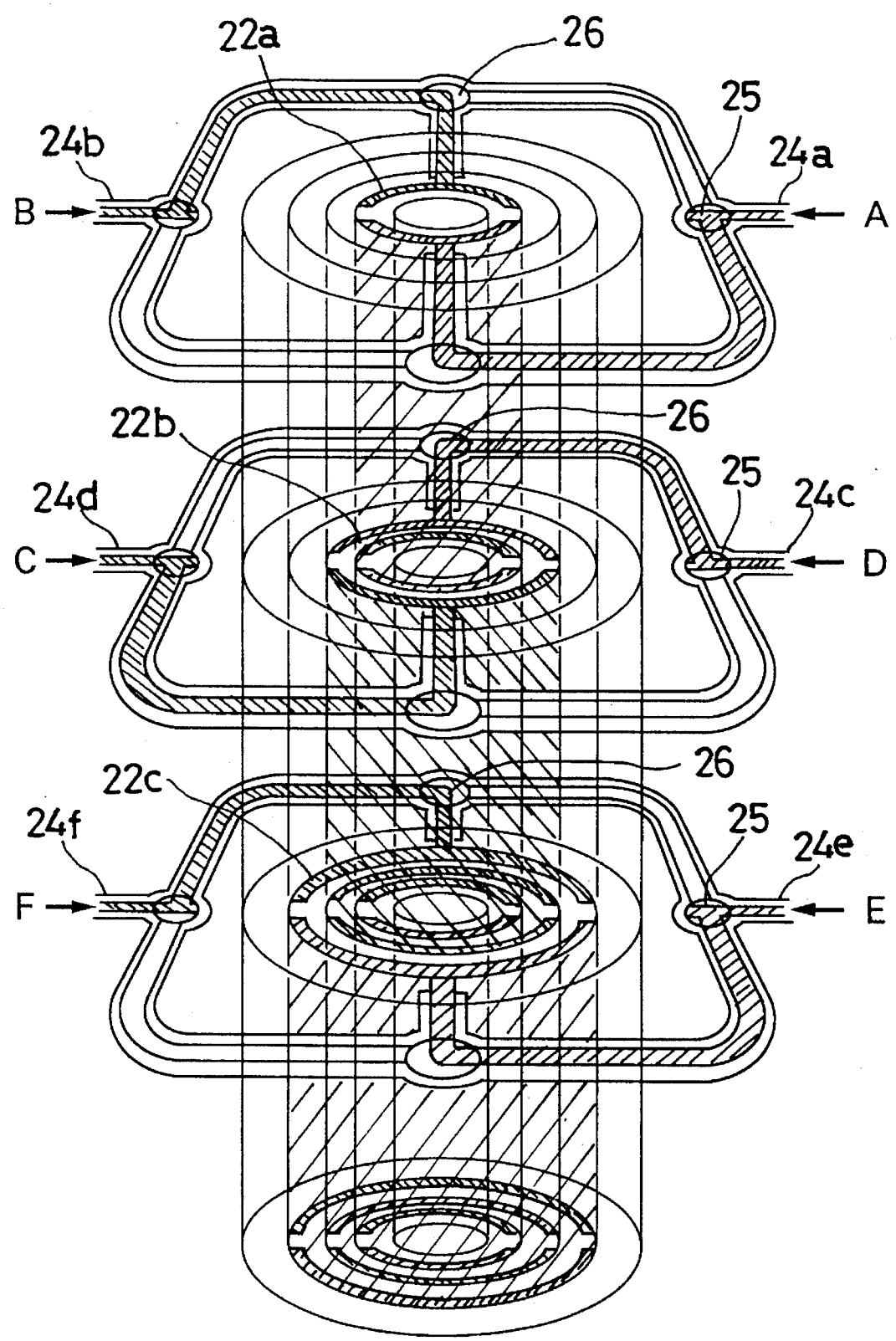
Figure 23:
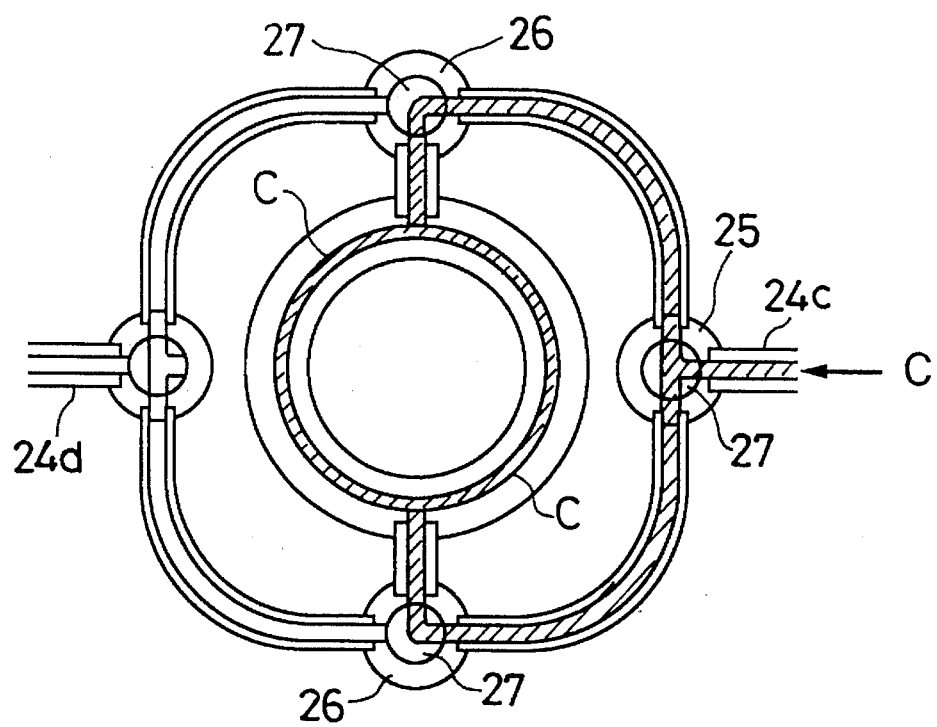

In Example 2 where the number of layers is 3 and the number of sections is 2, it is possible to supply a maximum of 6 kinds of resins A, B, C, D, E, and F to form two equal sections with a circumferential width of 180°. The resin distribution tubes 24a, 24b, 24c, 24d, 24e, and 24f attached to the tips of extruders respectively have one branch-off point 25 and one junction 26 and each of them has a flow switchover valve 27 as shown in FIGS. 21 and 22. With the aid of the branch-off points 25 and the junctions 26 provided in the resin distribution tubes 24a, 24b, 24c, 24d, 24e, and 24f, it is possible to control, for example, the molten resins to be supplied to two passages 22b in the multiple annular passage 20 from the tips of extruders through the resin distribution tubes 24c and 24d as shown in FIG. 21. FIG. 22 illustrates how two kinds of resins C and D can be supplied to the opposite side of the passage 2b by changing the direction of flow with the aid of the flow switchover valve 27. On the other hand, FIG. 23 illustrates how resin C is supplied only through the resin distribution tube 24c; the flow of the resin is divided into the right and left direction by the branch-off point 25 and resin C is supplied through the junctions 26 to the whole of two passages 22b. With the adoption of the resin distribution tubes 24a, 24b, 24c, 24d, 24e, and 24f fitted with the branch-off points 25 and the junctions 26, it becomes possible to combine resins C and D in four different ways, namely (C, D), (D,C), (C, C), and (D, D), in the passage 22b formed by a passage-forming tube 20b by manipulating the flow switchover valve 27. Since the same holds true to all the passages 22a, 22b, and 22c, the number of patterns of layers in the multilayer parison $P_2$ will be enormous even when not all of six kinds of resins are used. It is therefore possible to mold hollow articles of desirable specification by selecting the number and kind of resins to meet the performance requirements, selecting the most suitable pattern for the layer structure of the multilayer parison to be created, and setting the flow switchover valves 27. There is no need here for changing parts inside the die head H.

The part numbered 28 in FIG. 18 is a bolt to fix the passage-forming tubes 20a, 20b, and 20c to the shell 20d and the part numbered 29 is a parison controller shaft to be driven by a hydraulic cylinder 30. The up-and-down movement of the parison controller shaft 29 causes a similar movement of a die core 21a of the nozzle 21 and controls the gap of the die through which a multilayer parison is extruded.

Figure 24:
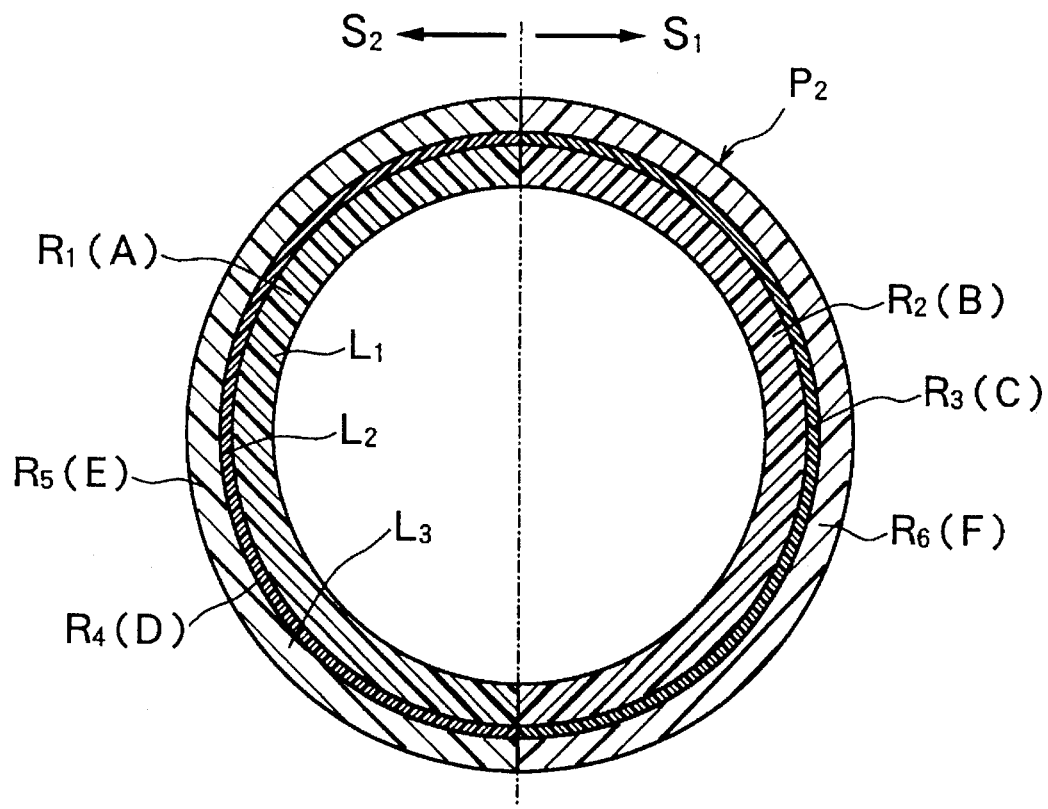
FIGS. 24 to 26 are schematic illustrations of the cross sections of multilayer parisons created by the process and apparatus of Example 2.

If the multilayer parison to be created by the process and apparatus of Example 2 were to have a structure of 6 kinds of resins ($R_1$~$R_6$, resins A~F), 3 layers ($L_1$~$L_3$), and 2 sections ($S_1$, $S_2$), its cross section would appear something like the one illustrated in FIG. 24. It is possible to change the number of layers n from 1 to 3 freely and independently in each of the two sections $S_1$ and $S_2$.

Figure 25:
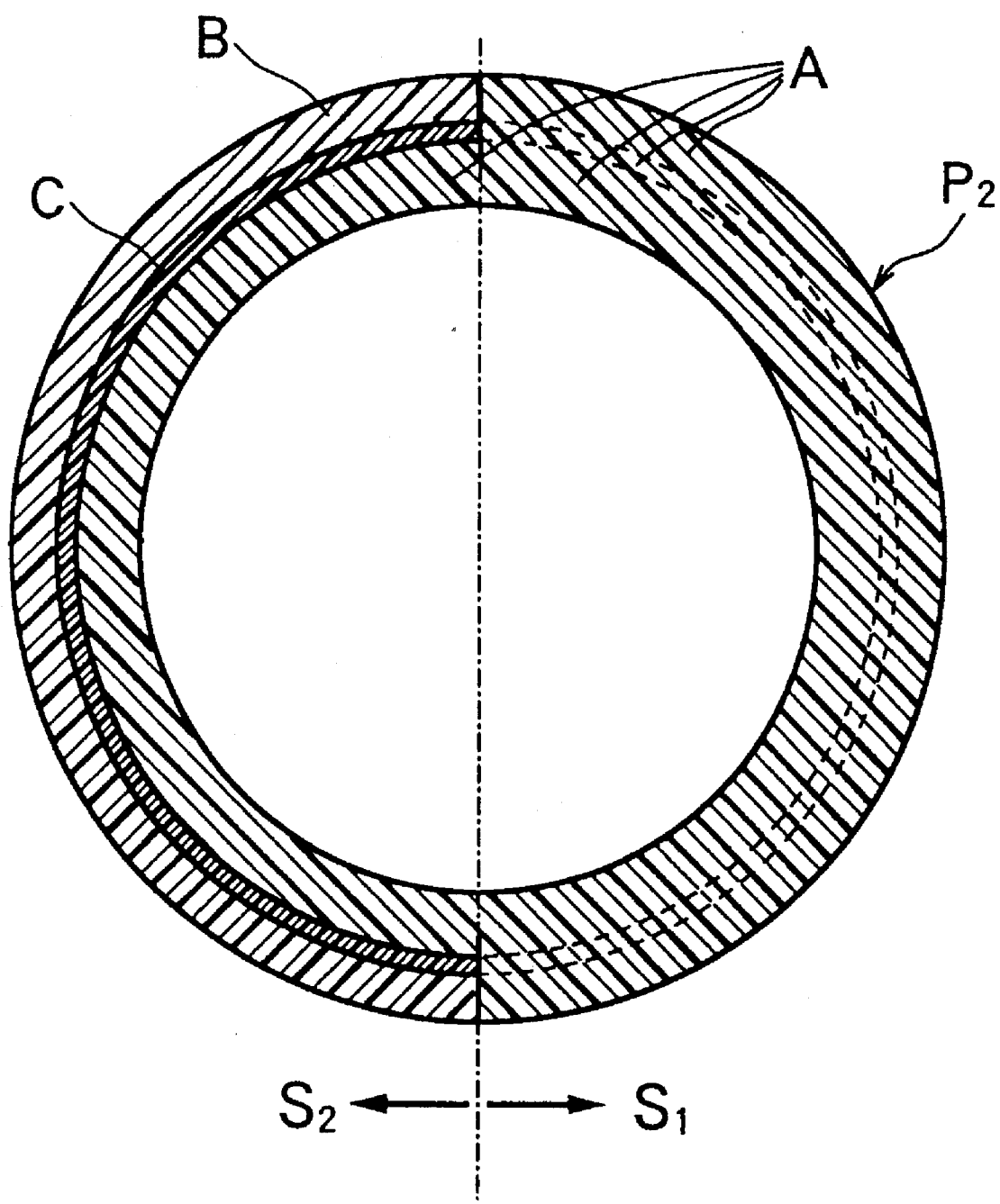
Figure 27:
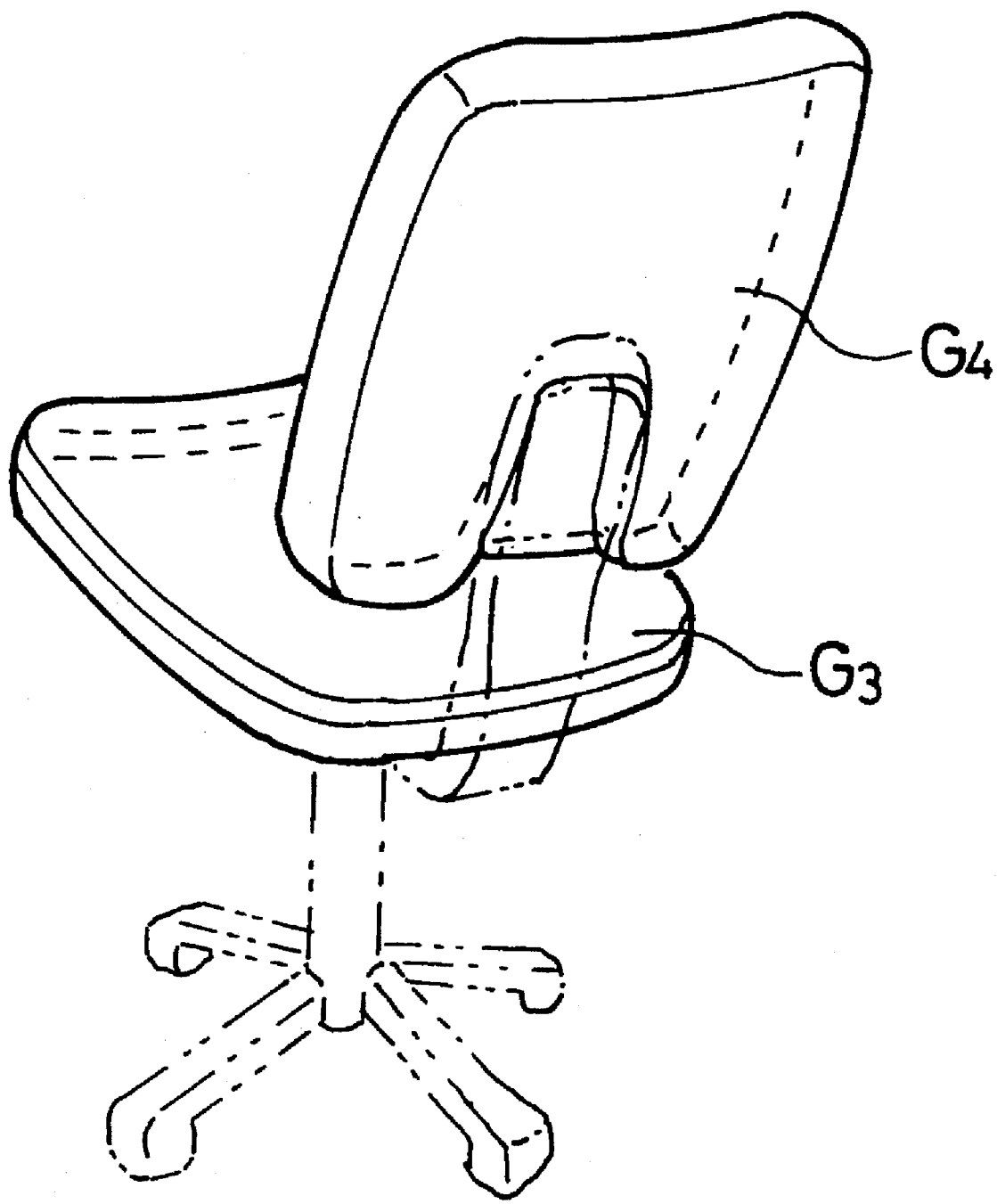
FIG. 27 is a perspective view of the seat and the back of a chair molded from the multilayer parison of Example 2.
Figure 28:
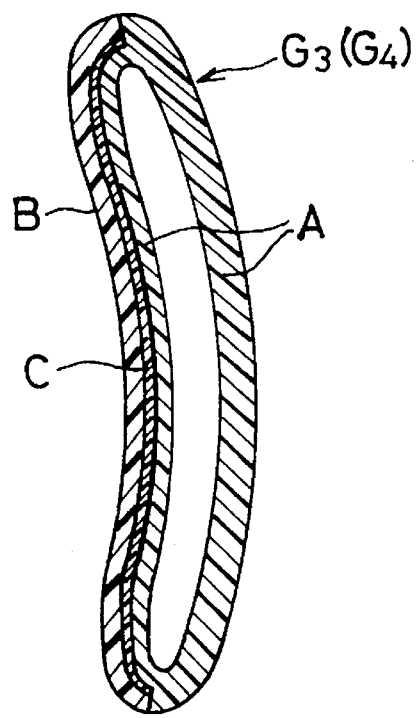
FIG. 28 is a schematic illustration of a section of the seat or back of the chair of FIG. 27.

Moreover, the process and apparatus of Example 2 make it possible to create a multilayer parison $P_2$ in which the section $S_1$ is composed of only one kind of resin A in an apparent single layer and the section $S_2$ is composed of three kinds of resins A, B, and C in three layers as shown in FIG. 25. A multilayer parison $P_2$ of such a structure is suitable for the molding of the seat $G_3$ and the back $G_4$ of a chair as illustrated in FIGS. 27 and 28. The face of the seat $G_3$ and that of the back $G_4$ coming into direct contact with the human body are composed of the three-layer section $S_2$ having resins A, B, and C. The resin B forming the outer layer is a flexible resin which is soft, agreeable to the touch, and not slippery and has a flexural modulus of 5,000 kgf/cm$^2$ or less and a Shore hardness A of 80 or less, for example, an elastomer. The resin A in the inner layer is a hard resin of excellent strength and toughness with a flexural strength of 10,000 kgf/cm$^2$ or more and a Rockwell hardness of 60 or more, for example, polypropylene. The resin C in the middle layer is adhesive and bonds the outer layer of resin B and the inner layer of resin A. The resin A in the back side must support the weight of a person sitting on it and is formed by the same hard resin as in the inner layer of the face side, for example, polypropylene.

Figure 26:
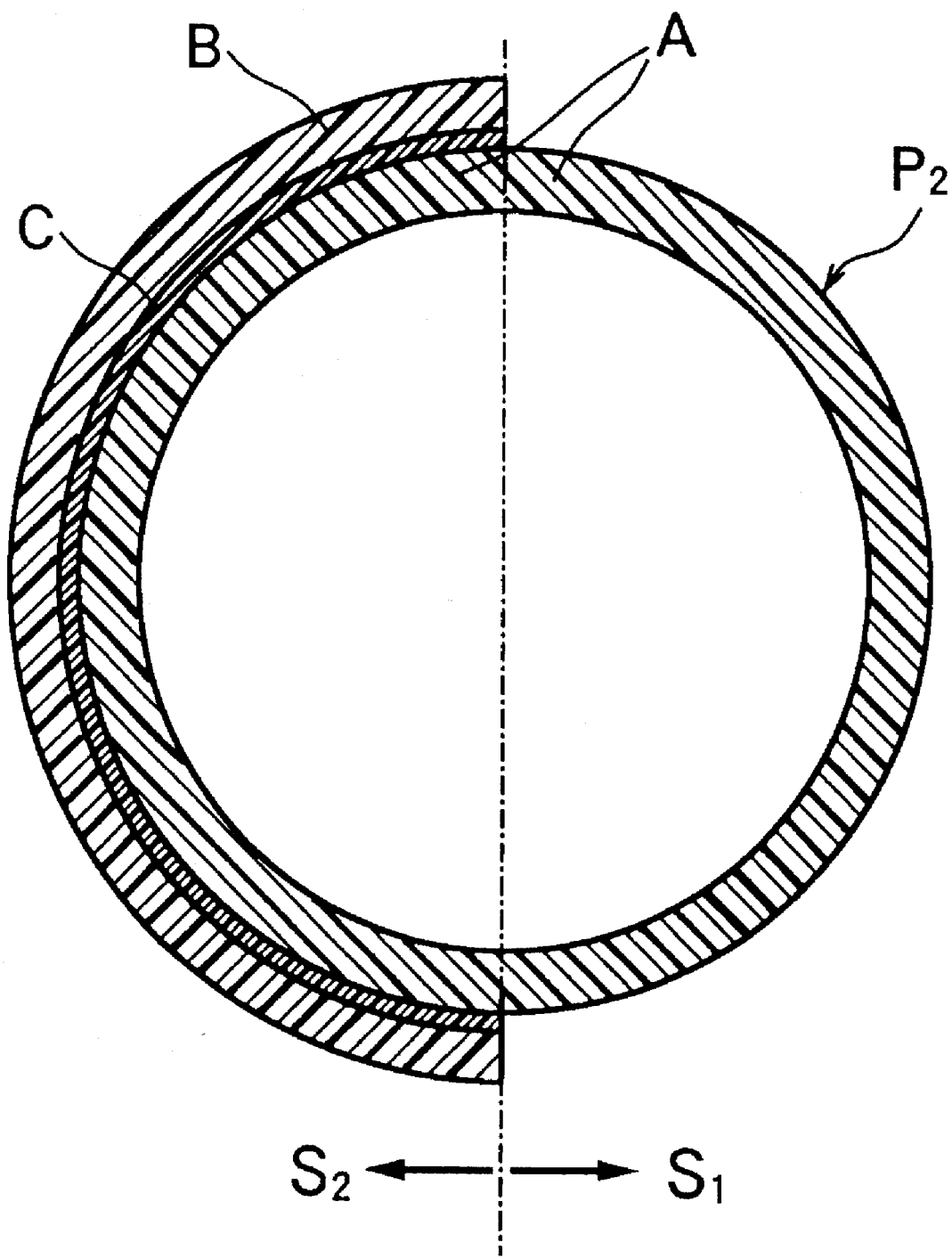
Figure 29:
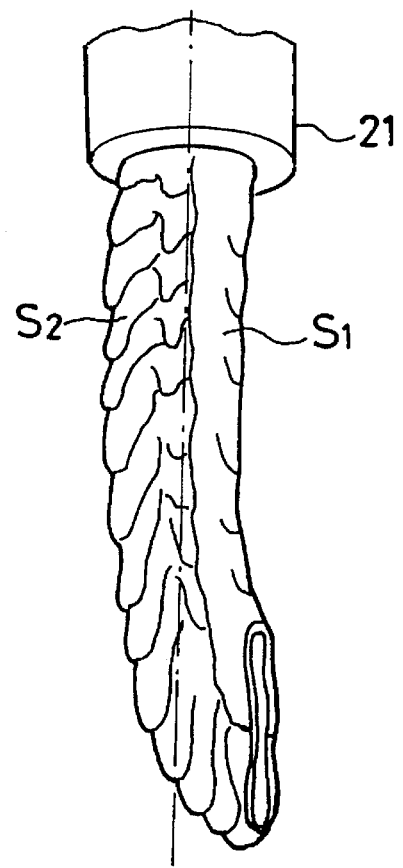
FIG. 29 is a perspective view of a multilayer parison warping in wrinkles towards the side of the smaller resin flow while being extruded.

The experiments conducted by the present inventors indicate that, in a multilayer parison $P_2$ such as shown in FIG. 25, it is advisable to control the combined quantity of molten resins flowing into the multilayer section $S_2$ at 0.7 to 1.3 times, preferably 0.8 to 1.2 times, more preferably 0.9 to 1.1 times, that flowing into the apparent single-layer section $S_1$. If the flows of molten resins lose balance and their ratio goes out of the aforesaid range for some reason, for example, by feeding the resin A into the single-layer section $S_1$ only through one passage and thereby forming literally a single layer as illustrated in FIG. 26, the multilayer parison $P_2$ extruded from the nozzle 21 of the die head H shrinks in wrinkles towards the side of a smaller flow of resins (towards the single-layer section $S_1$ in this case) as illustrated in FIG. 29 and the molding operation sometimes becomes impossible to perform because of excessive curving. A proper control of the combined flow of molten resins into the multilayer section $S_2$ and the flow of molten resins into the apparent single-layer section $S_1$ can realize a substantially uniform wall thickness in every part regardless of the number of layers n in each section.

Example 3

This example relates to the third mode of the multilayer blow molding process, an apparatus, and hollow articles of this invention.

Figure 30:
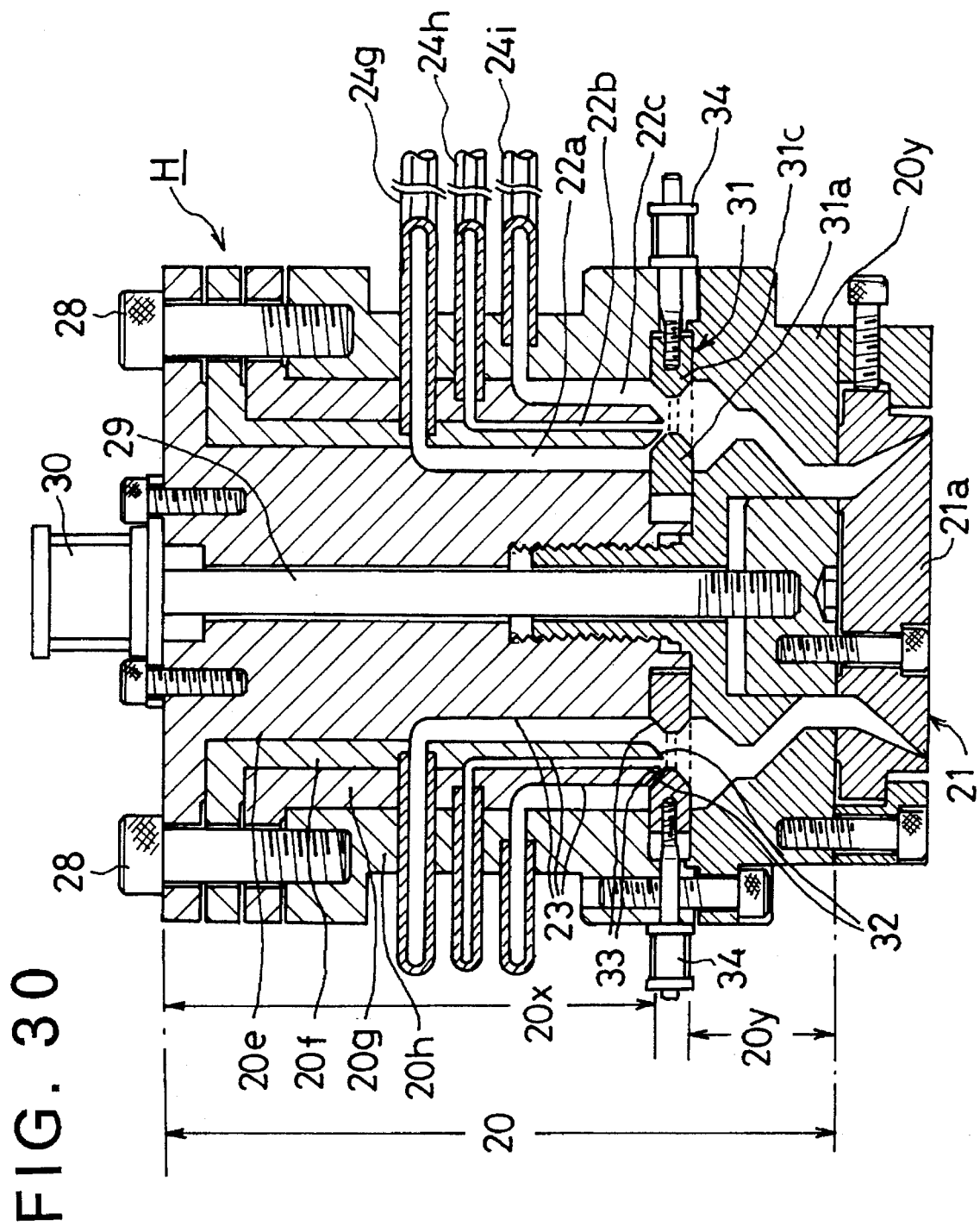
FIG. 30 is a schematic illustration in section of a multilayer blow molding apparatus to practice the third mode of the process of this invention relating to Example 3.
Figure 31:
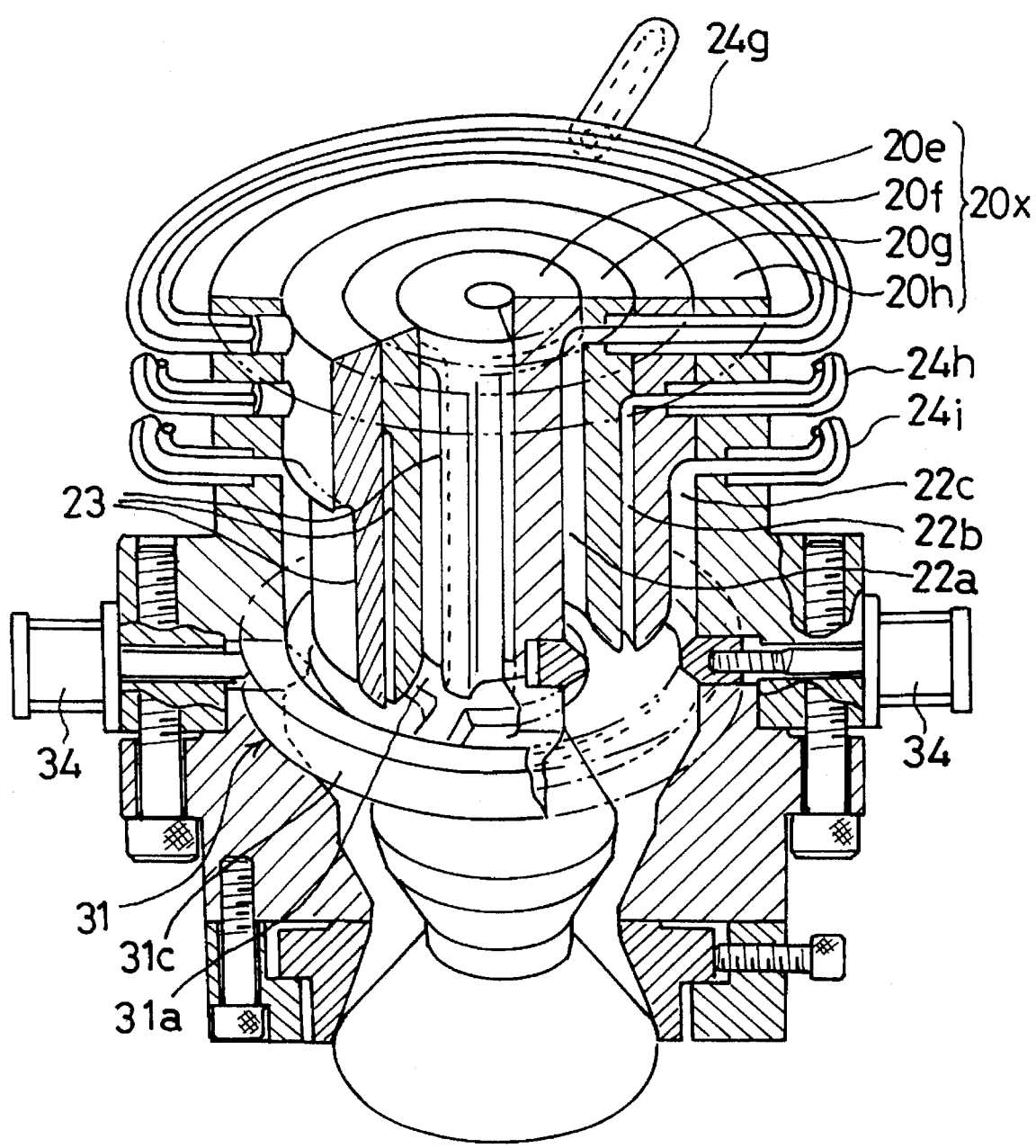
FIG. 31 is a view illustrating the ring-shaped passage width control valves of FIG. 30 and their vicinity.

The multilayer blow molding apparatus to practice the third mode of the process is, as shown in FIGS. 30 and 31, basically the same as that for the practice of the second mode shown in FIG. 18 and has the following additional features. In the die head H, two equal sections (p= 2) with a sectional width of 180° are formed in the multiple tubular passage 20 as in the aforesaid Example 2. The multiple annular passage 20 is divided into a passage 20x which contains passages 22a, 22b, and 22c constructed by putting three tubes 20e, 20f, and 20g and a shell 20h together and a resin joint 20y where the plural resins flowing through 20x join. A ring-shaped passage width control valve 31 is installed between 20x and 20y beneath each passage 22a, 22b, or 22c and the said valve 31 is capable of making a reciprocating motion in the direction at a right angle to the flow of molten resins and changing the width of the lower opening of each passage 22a, 22b, and 22c and, in turn, changing the wall thickness of the resin layer in each section in the direction of the extrusion of the parison.

The parts numbered 21, 28, 29 and 30 in FIGS. 30 and 31 refer respectively to a bolt used for assembling the nozzle, three passage-forming tubes 20e, 20f, and 20g, and the shell 20h, a parison controller shaft, and a hydraulic cylinder as in the above-mentioned Example 2.

Figure 32:
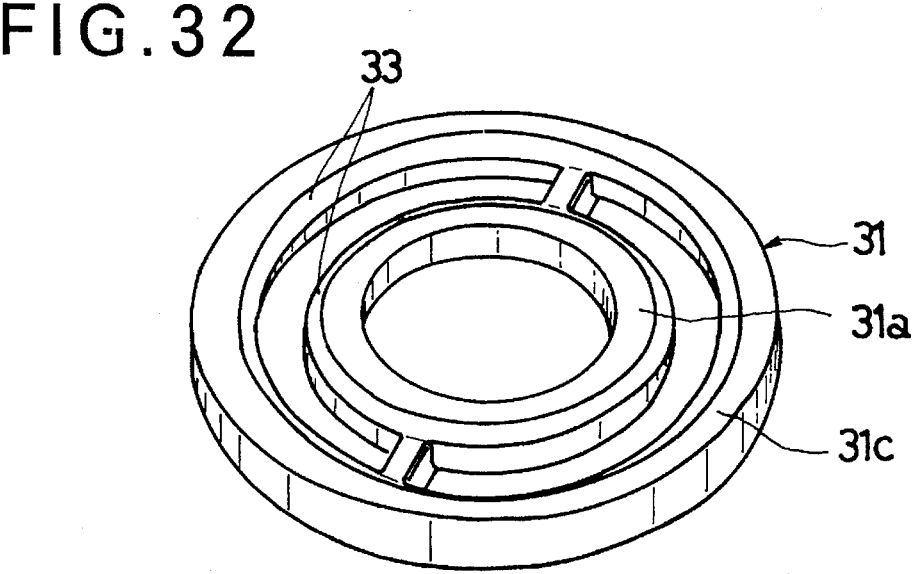
FIG. 32 is a perspective view of the ring-shaped passage width control valve of FIG. 30.
Figure 33:
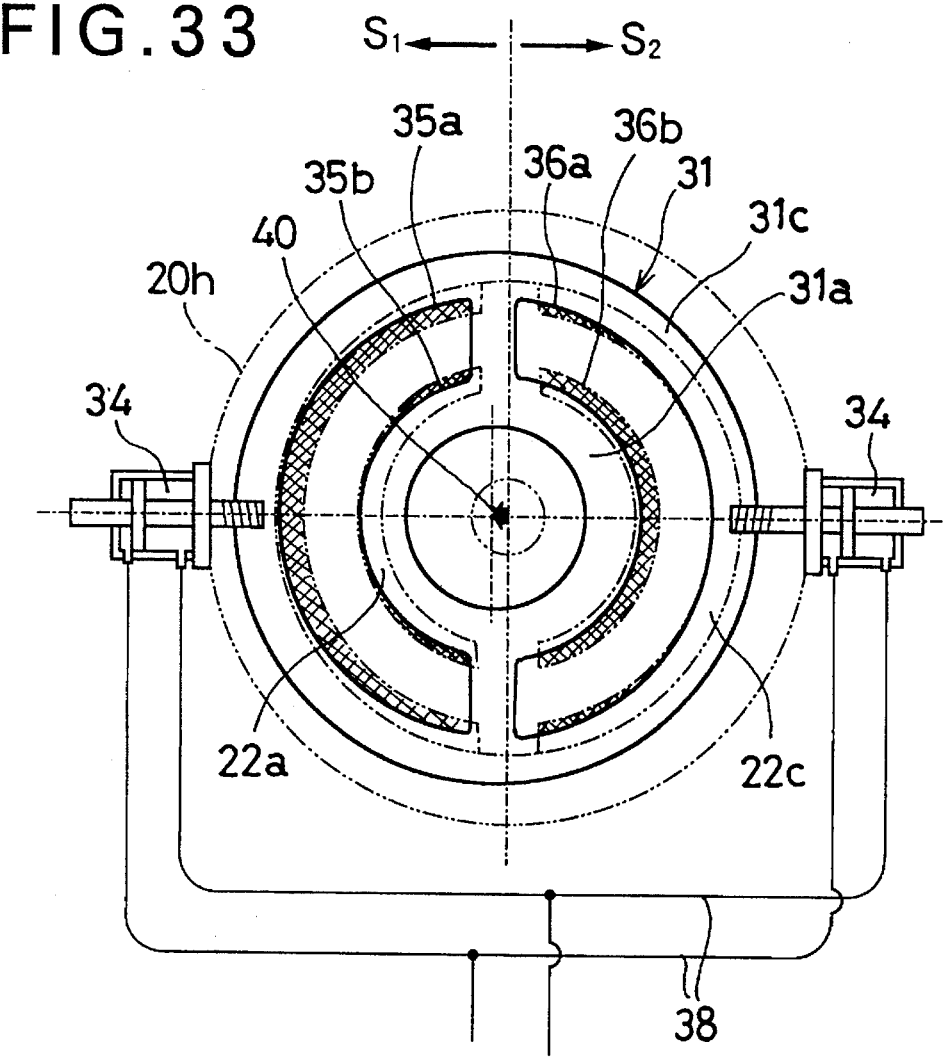
FIGS. 33 and 34 illustrate how the ring-shaped passage width control valve functions.
Figure 34:
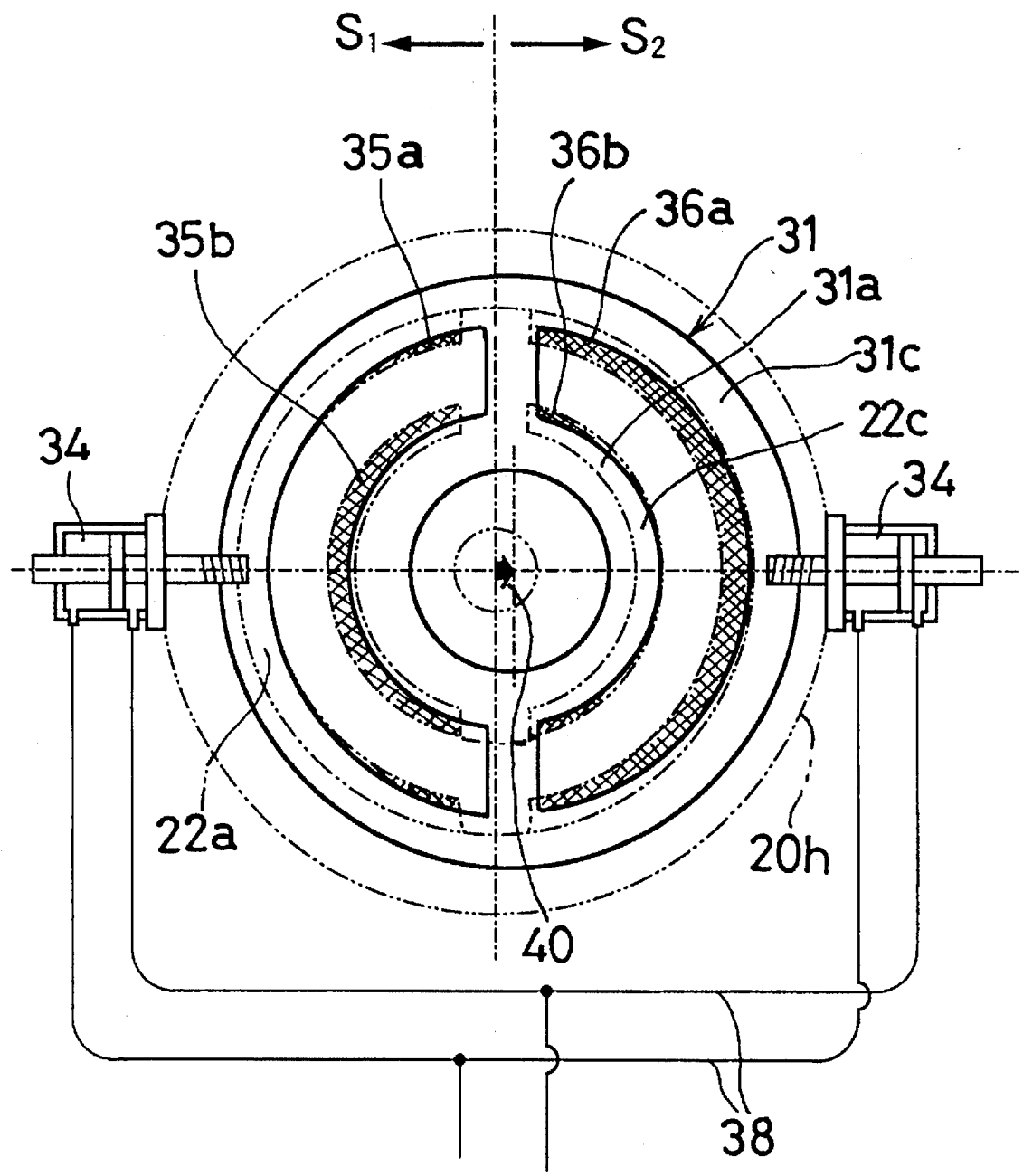

The passasge width control valve 31 in this Example 3 has two rings 31a and 31c which arc arranged concentrically with a given distance maintained between them and linked together at two sites as illustrated in FIG. 32. The ring 31a or 31c has a bevel 33 which contacts a seat 32 provided at the lower edge of the tube 20f or 20g. The passage width control valve 31 is connected to a pair of hydraulic cylinders 34 provided on both sides in the direction of motion and is made to move towards right or left by the hydraulic cylinders 34 as illustrated in FIGS. 33 and 34. A motion of the said valve to one side decreases the width of the lower opening of one of the passages 22a and 22c in one section of 20x and at the same time increases that in the other section on the opposite side. This motion also increases the width of the lower opening of the other of the passages 22a and 22c in one section and decreases that in the other section on the opposite side. In FIG. 33, the passage width control valve 31 has shifted to the end of its stroke towards the section $S_1$ to maximize the wall thickness of the outer layer 35a in the section $S_1$ and that of the inner layer 35b of the section $S_2$ and minimize the wall thickness of the inner layer 35b in the section $S_1$ and that of the outer layer 36a in the section $S_2$. Contrarily, in FIG. 34, the passage width control valve 31 has shifted to the end of its stroke towards the section $S_2$ to minimize the wall thickness of the outer layer 35a in the section $S_1$ and that of the inner layer 36b in the section $S_2$ and maximize the wall thickness of the inner layer 35b of the section $S_1$ and that of the outer layer 36a in the section $S_2$. In FIGS. 33 and 34, the part numbered 38 is a piping to drive the aforesaid pair of hydraulic cylinders 34 and the symbol 40 is a vector indicating the direction of motion and the width of motion of the passage width control valve 31.

Figure 35:
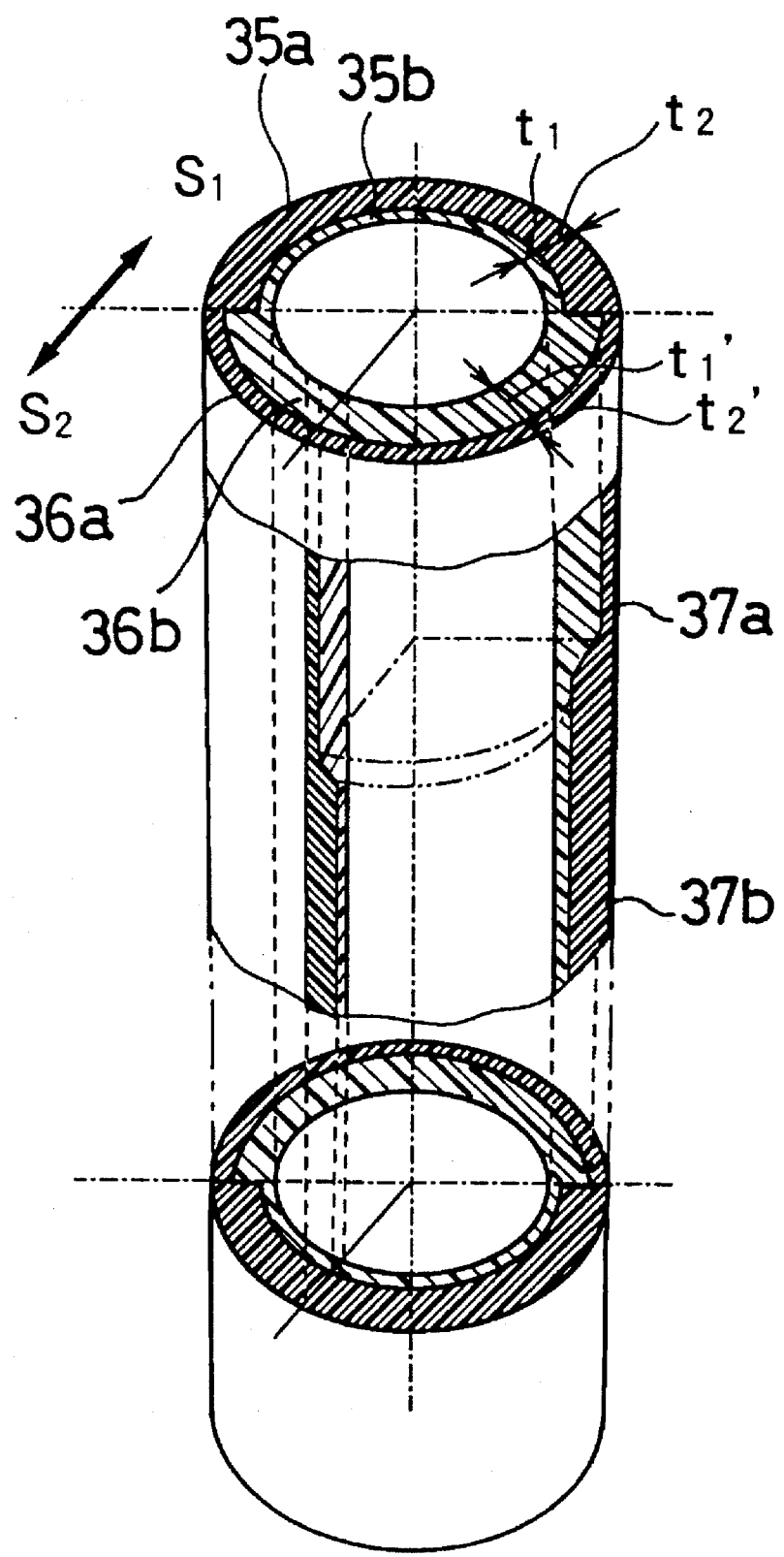
FIG. 35 is a perspective view of a multilayer parison created by the process and apparatus of Example 3.

The multilayer parison $P_3$ to be created in this Example 3 has a 3-resin- 3-layer-2-section structure as shown in FIG. 35. In its two sections $S_1$ and $S_2$, the wall thickness of the outer layers 35a and 36a and that of the inner layers 35b and 36b change in the direction of the extrusion of the parison, differently in the upper region 37a and the lower region 37b. Designating the wall thickness of the inner layer 35b and that of the outer layer 35a in the section $S_1$ respectively as $t_1$ and $t_2$ and their ratio as $r_1$ and likewise $t_{1'}$, $t_{2'}$, and $r_2$ in respect to the section $S_2$ in a cross section at any point in the longitudinal direction of the parison $P_3$, $r_1$ and $r_2$ are seen to change in such a manner as to keep the product of $r_1$ and $r_2$ approximately unity.

In consequence, the process and apparatus of Example 3 make it possible not only to extrude a multilayer parison $P_3$ of an m-resin-n-layer- 2-section pattern and mold a variety of hollow articles as in Examples 1 and 2 but also to vary the wall thickness ratio of the inner and outer layers in each of the sections $S_1$ and $S_2$ in the longitudinal direction of the parison with the aid of the passage width control valve installed inside the die head and to mold hollow articles exhibiting a pattern of marked property changes from region to region. This capability of changing the wall thickness ratio in the longitudinal direction of the parison offers the following advantage in the simultaneous blow molding of plural hollow articles from a single multilayer parison with a vertical arrangement of plural cavities; it now becomes possible to arrange each cavity alternately facing the opposite direction, distribute the clamping force uniformly over the mold, and improve the operating efficiency of blow molding markedly.

Figure 36:
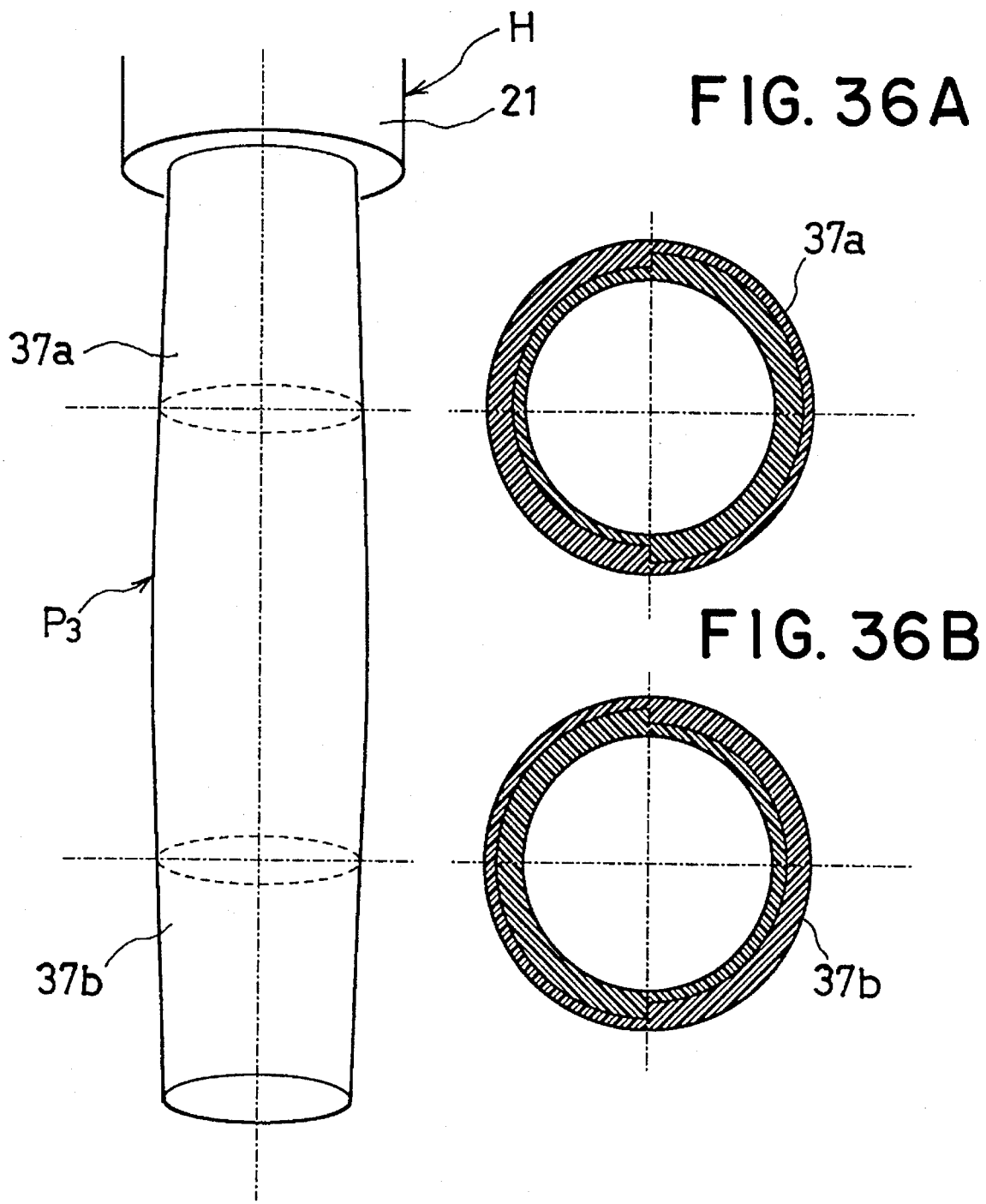
FIG. 36 is an illustration of cross sections of a multilayer parison created by the process and apparatus of Example 3.
Figure 37:
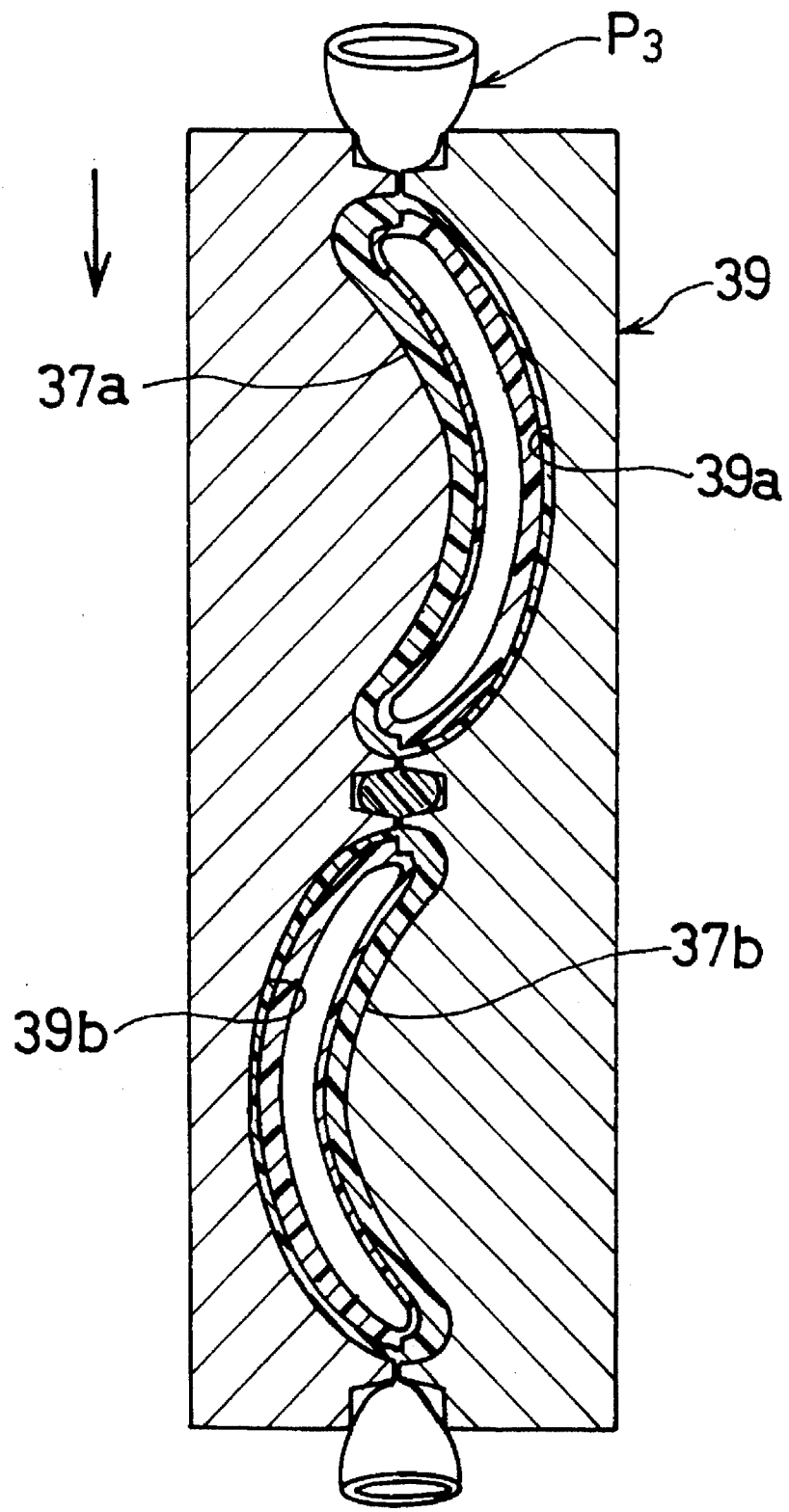
FIG. 37 illustrates a multilayer parison created by the process and apparatus of Example 3 being clamped in a mold.

The case in point is the molding of the seat and back of a chair earlier illustrated in FIGS. 27 and 28 in Example 2. As shown in FIGS. 36 and 37, the multilayer parison $P_3$ extruded from the nozzle 21 of the die head H has an exactly opposite relationship in the wall thickness ratio of the inner and outer layers in its cross section in the upper region 37a and the lower region 37b of the two sections. Also, the upper cavity 39a and the lower cavity 39b of the mold 39 are positioned facing the opposite direction and this allows the clamping force to act uniformly all over the mold 39 when the mold halves are clamped to perform blow molding.

Example 4

This example relates to the fourth mode of the multilayer blow molding process, an apparatus, and hollow articles of this invention.

Figure 38:
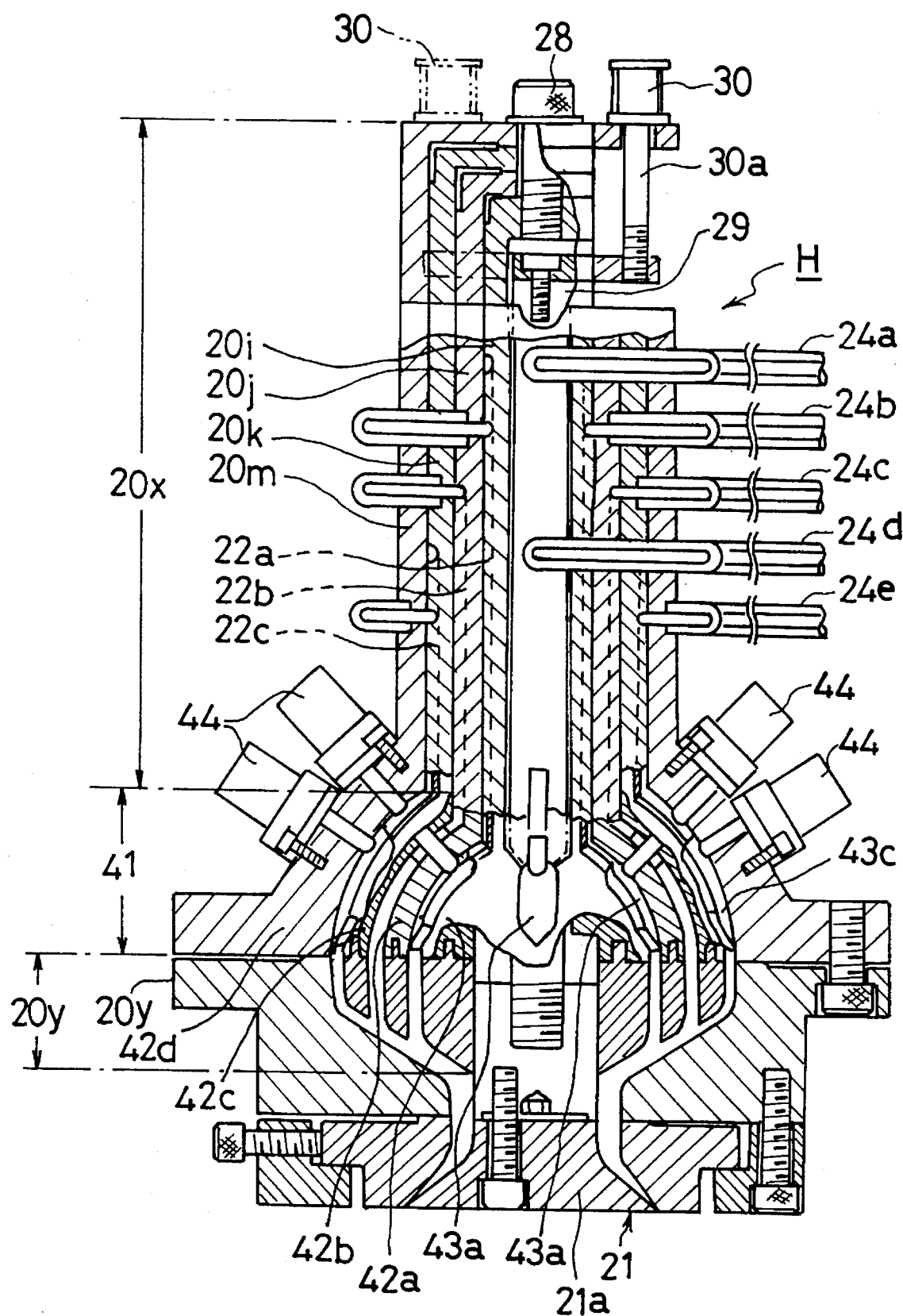
FIG. 38 is an illustration in section of a multilayer blow molding apparatus to practice the fourth process of this invention relating to Example 4.
Figure 39:
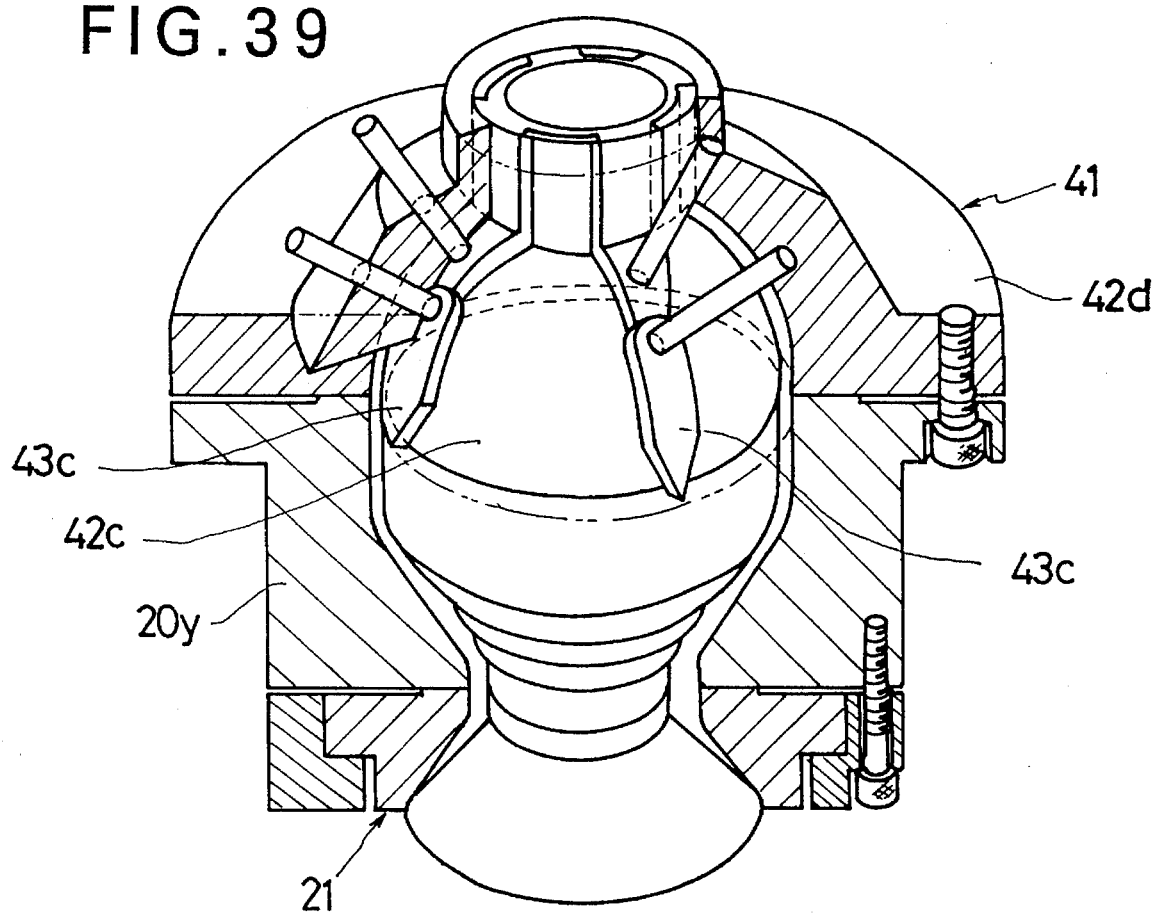
FIGS. 39 to 42 illustrate how a flapping nail is attached.

The apparatus to practice the fourth mode of the process is illustrated in FIGS. 38 and 39 and is basically the same as the one to practice the second mode of the process shown in FIG. 18 with the following features added. The multiple annular passage 20 in the die head H is divided into a passage 20x which contains annular passages 22a, 22b, and 22c constructed by putting three tubes 20i, 20j, and 20k and a shell 20m together and a resin joint 20y where plural resins flowing through 20x join. A passage width controller 41 is installed as an integral part between 20x and 20y beneath 20x to change the width of each section in the circumferential direction of the parison for each resin layer. The passage width controller 41 is composed of funnel-shaped hemispherical shells 42a, 42b, 42c, and 42d formed integrally at the lower ends of the passage-forming tubes 20i, 20j, and 20k and the shell 20m and tongue-shaped flapping nails 43a and 43c which are attached to the outer surface of the hemispherical shells 42a and 42c at a location corresponding to the lower end of the partition wall constituting the boundary of each section in the passage 20x and oscillate to change the width of each section of the parison to be created. This device enables the creation of multilayer parisons with their sectional width changing in the direction of the extrusion of the parison.

Figure 40:
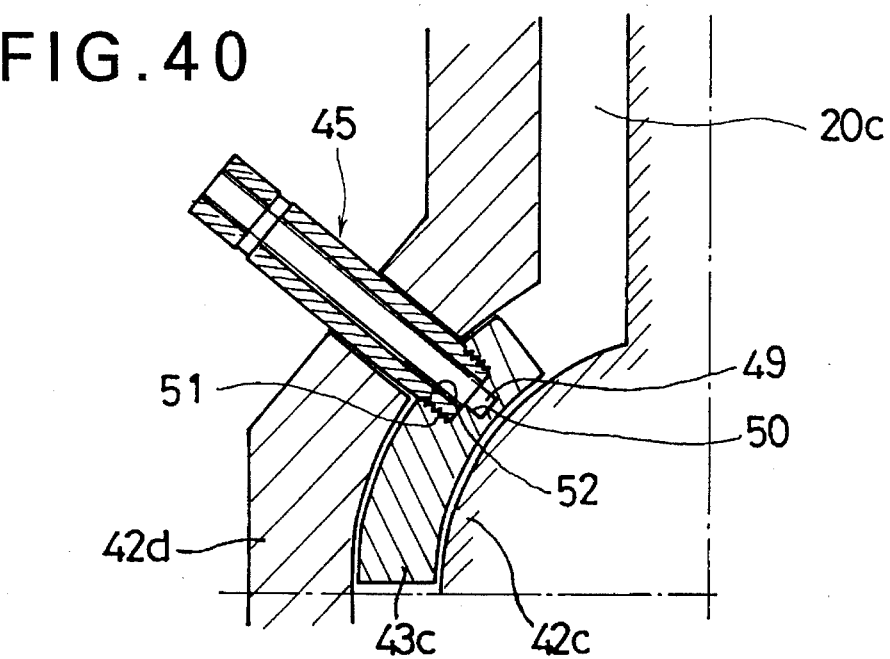
Figure 41:
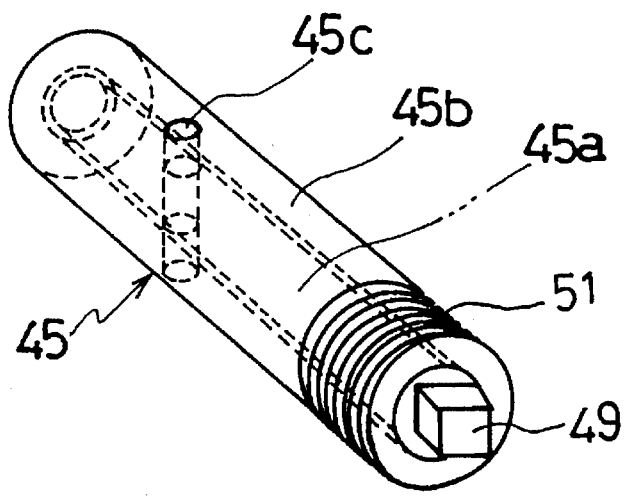
Figure 42:
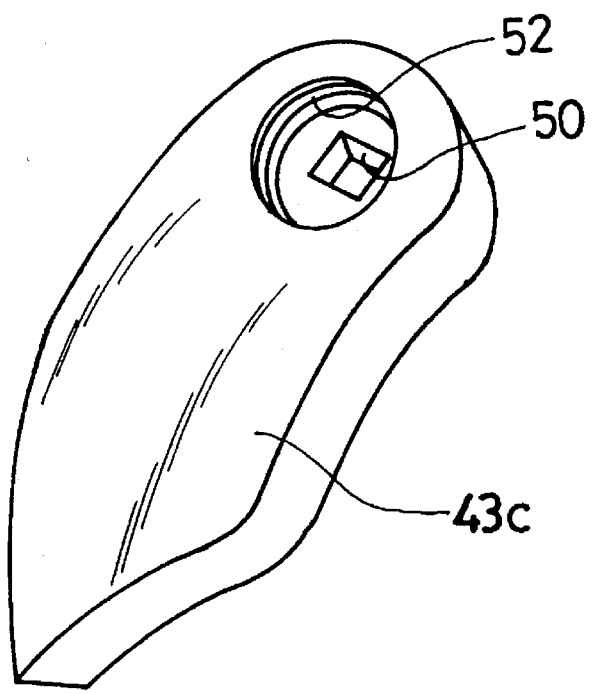

The positional relationship of the hemispherical shells 42a, 42b, 42c, and 42d and the oscillatory tongue-shaped flapping nails 43a and 42c constituting the sectional width controller 41 in Example 4 is schematically shown in FIG. 39 in respect to the outermost hemispherical shell 42d, the hemispherical shell 42c which is the inside neighbor of 42d, and the flapping nail 43c. The flapping nails 43a and 43c are constructed as shown in FIGS. 40 to 42 with 43c taken as an example. The flapping nail 43c is provided with a driving shaft 45 which is connected to the driving device 44 (shown in FIG. 38). The driving shaft 45 is composed of a torque shaft 45a which transmits a rotating motion to the flapping nail 43c, a support pipe 45b which is tubular and threaded at its tip into the flapping nail 43c, and a pin 45c which holds the torque shaft 45a and the support pipe 45b together. The upper and lower surfaces of the flapping nails 43a and 43c are curved so that they fit the hemispherical shells 42b and 42d on the outside and the hemispherical shells 42a and 42c on the inside.

Figure 43:
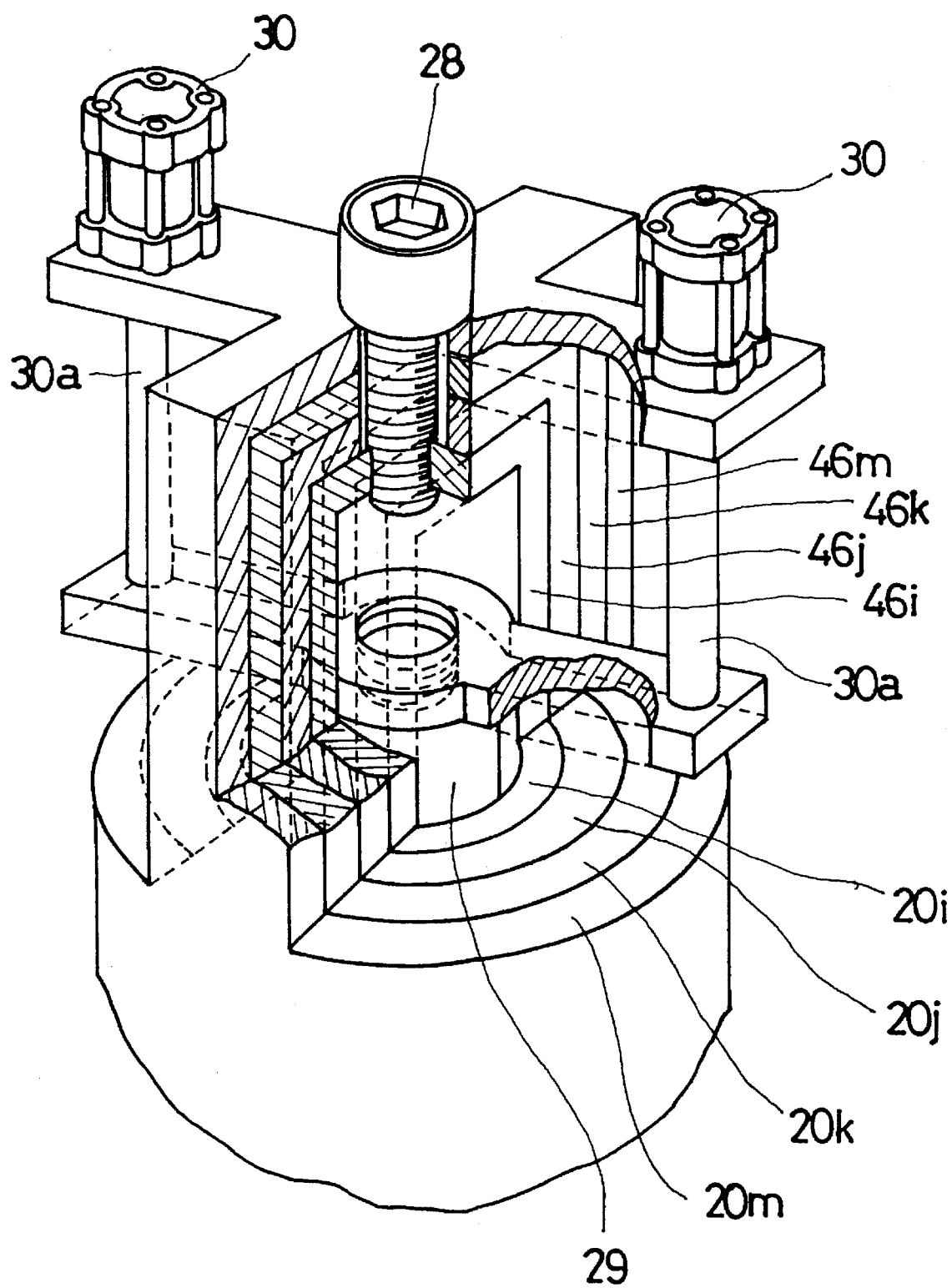
FIG. 43 is a perspective view illustrating how passage-forming tubes and a shell are assembled.

Arch-like fittings 46i, 46j, 46k, and 46m are provided on the top of the passage-forming tubes 20i, 20j, and 20k and the shell 20m constituting the multiple annular passage 20 as shown in FIG. 43 and a bolt 28 penetrating through these fittings holds them together to secure a concentric arrangement of 20i, 20j, 20k, and 20m. The shafts 30a of the hydraulic cylinders 30 attached to the shell 20m are fixed to the upper end of the parison controller shaft 29 running through the tube 20i. The hydraulic cylinders 30 move the parison controller shaft up and down and this motion, in turn, moves the die core 21 of the nozzle 21 up and down to control the gap of die through which the multilayer parison is extruded.

Figure 44:
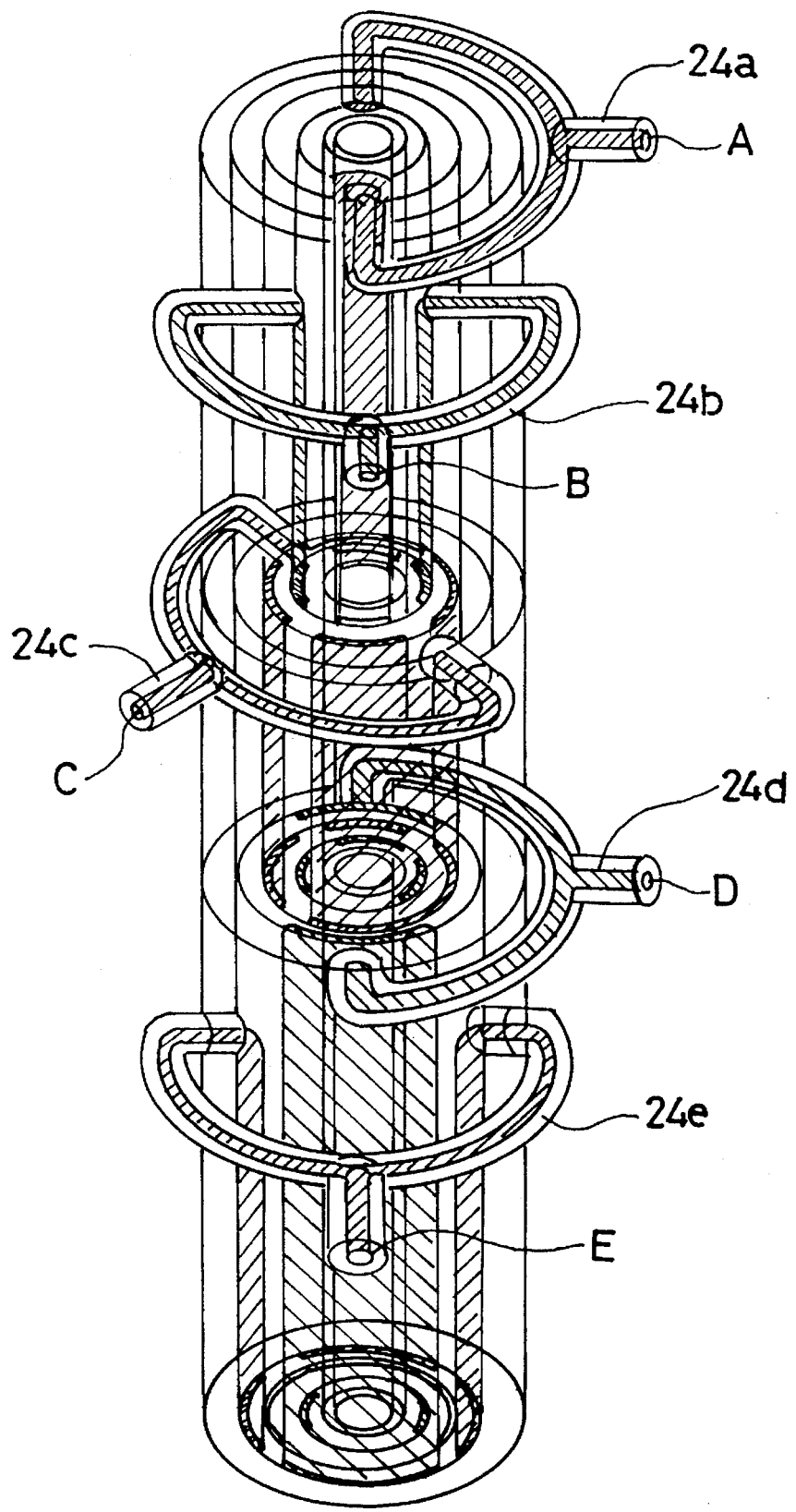
FIGS. 44 and 45 are illustrations of the multiple annular passage in Example 4.
Figure 45:
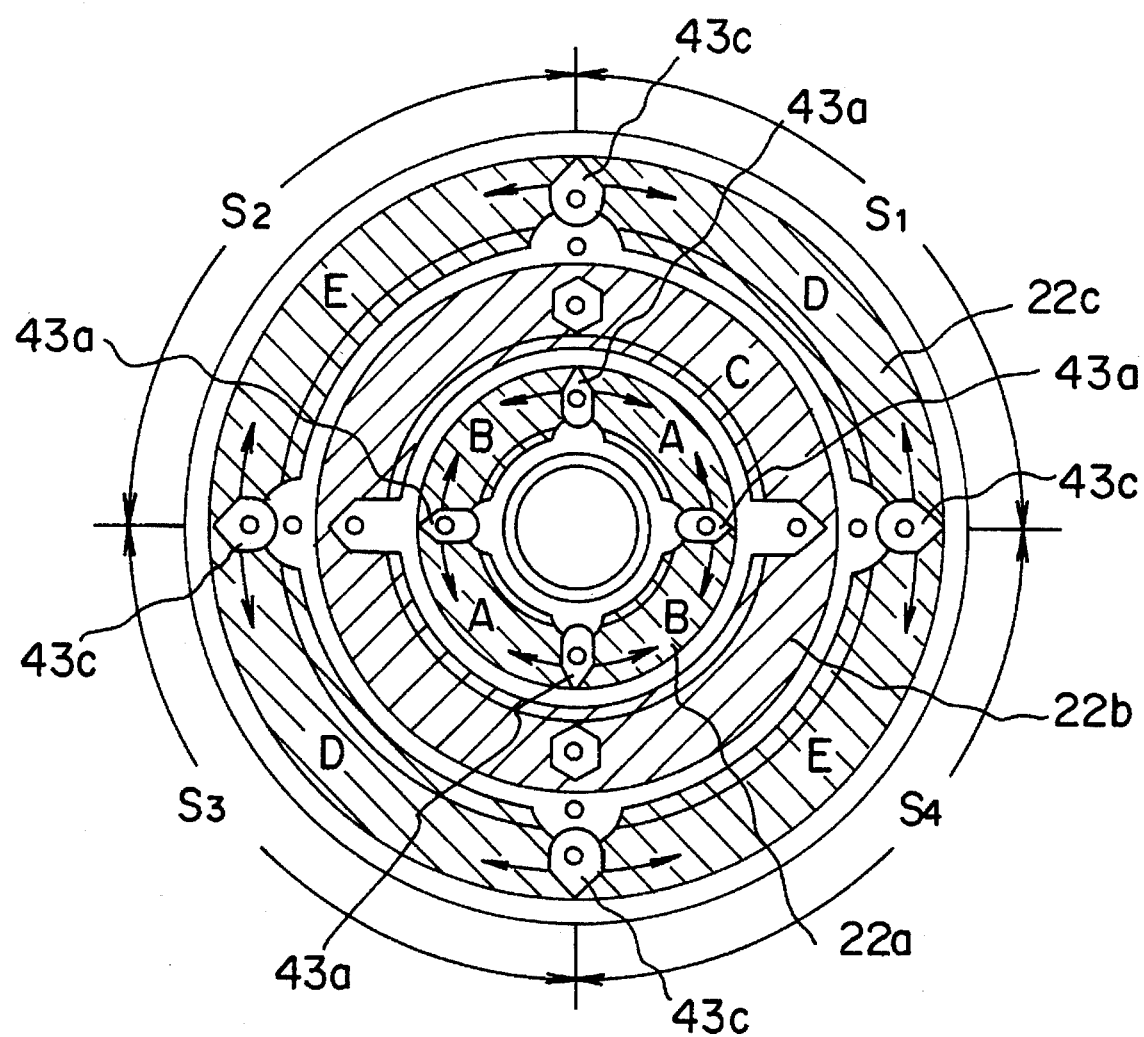
Figure 46:
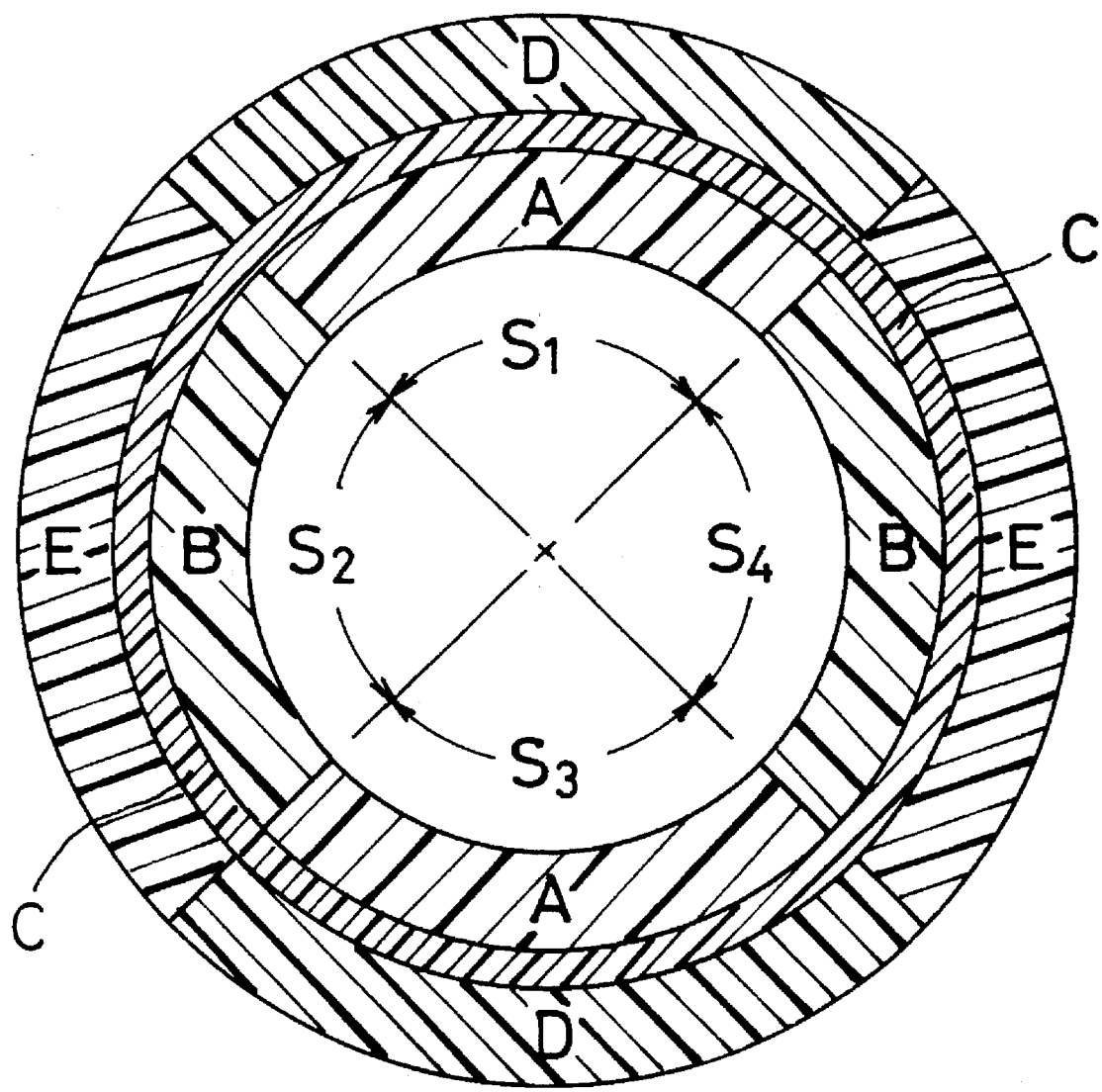
FIG. 46 illustrates a multilayer parison to be created in Example 4.

In Example 4, the two annular passages 22a and 22c shown in FIG. 38 are divided into four sections $S_1$, $S_2$, $S_3$, and $S_4$ as shown in FIGS. 44 to 46 and each of the flapping nails 43a and 43c is provided at a location following the lower end of the partition wall (not shown) dividing the passages 22a and 22c into the four sections. There is no section formed in the remaining annular passage 22b. The resin distribution tube 24a is connected to the two sections $S_1$ and $S_3$ formed in the annular passage 22a to supply molten resin A from an extruder (not shown), the resin distribution tube 24b is connected to the other two sections $S_2$ and $S_4$ formed in the annular passage 22a to supply molten resin B from an extruder (not shown), and the resin distribution tube 24c is connected to the annular passage 22b to supply molten resin C. Moreover, the resin distribution tube 24d is connected to the two sections $S_1$ and $S_3$ formed in the annular passage 22c to supply molten resin D from an extruder (not shown) and the resin distribution tube 24e is connected to the other two sections $S_2$ and $S_4$ formed in the annular passage 22c to supply molten resin E from an extruder (not shown). In FIG. 44, it is necessary to feed resins A and B which form inner layers upstream of resin C which forms a layer outside of A and B and also to feed resin C upstream of resins D and E which form layers outside of C for the following reason. Suppose the resin distribution tubes 24a and 24b are placed downstream of the resin distribution tube 24c, resins A and B flowing from the tubes 24a and 24b into the annular passage 22a located farthest within the multiple annular passage 20x must penetrate through resin C flowing down the annular passage 22c located outside of the passage 22a.

Figure 47:
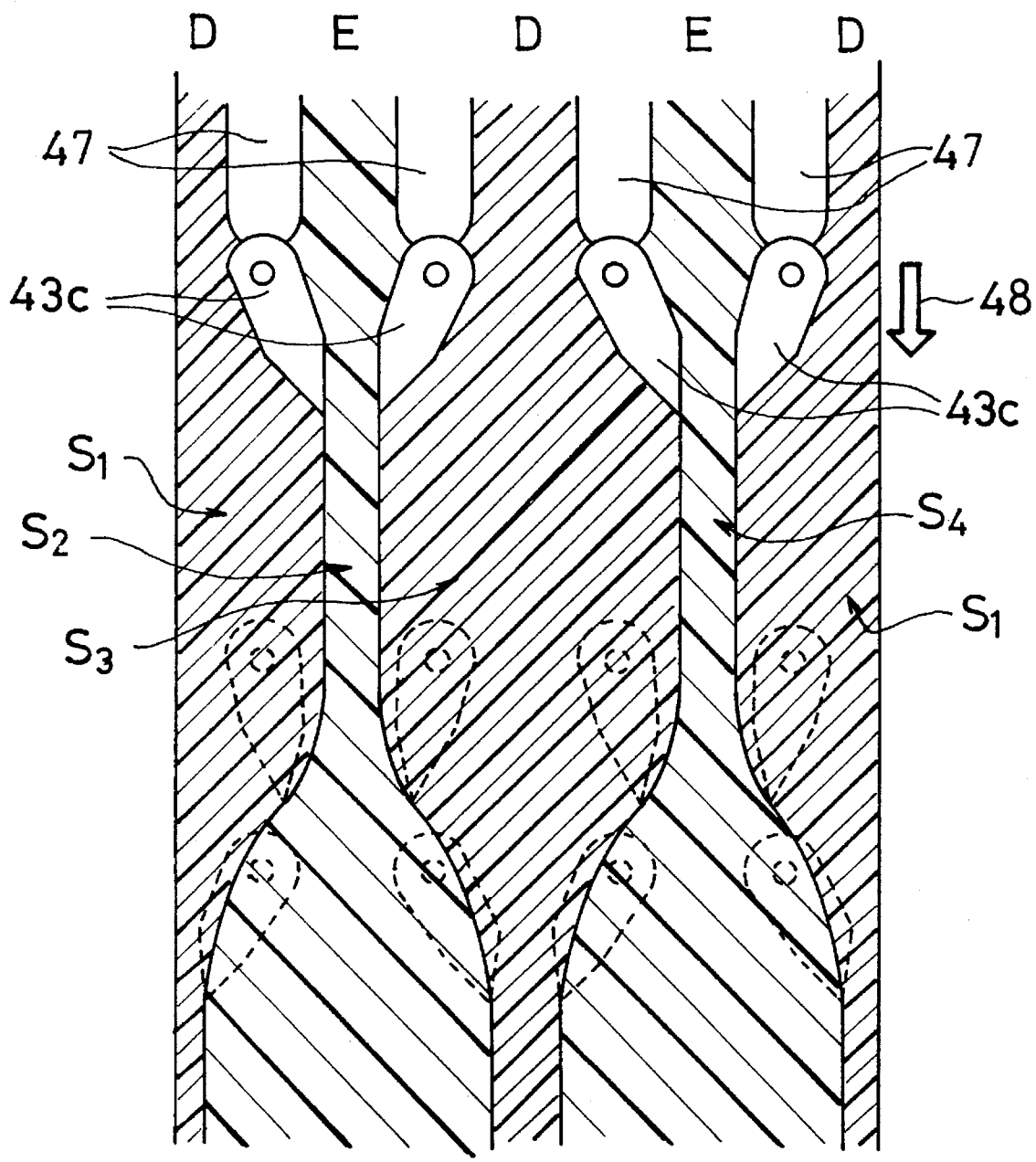
FIG. 47 illustrates how flapping nails change the sectional width in each section.

In FIG. 47 is schematically shown the way to control the width of the sections $S_1$, $S_2$, $S_3$, and $S_4$ with reference to a planar development of the annular passage 22c. It is possible to vary the width of the sections $S_1$, $S_2$, $S_3$, and $S_4$ by oscillating the four flapping nails 43c attached to the lower ends of the partition walls 47 dividing the passage 22c into the four sections at a specified timing in a specified width. The arrow 48 indicates the direction of flow of the molten resins D and E.

Figure 48:
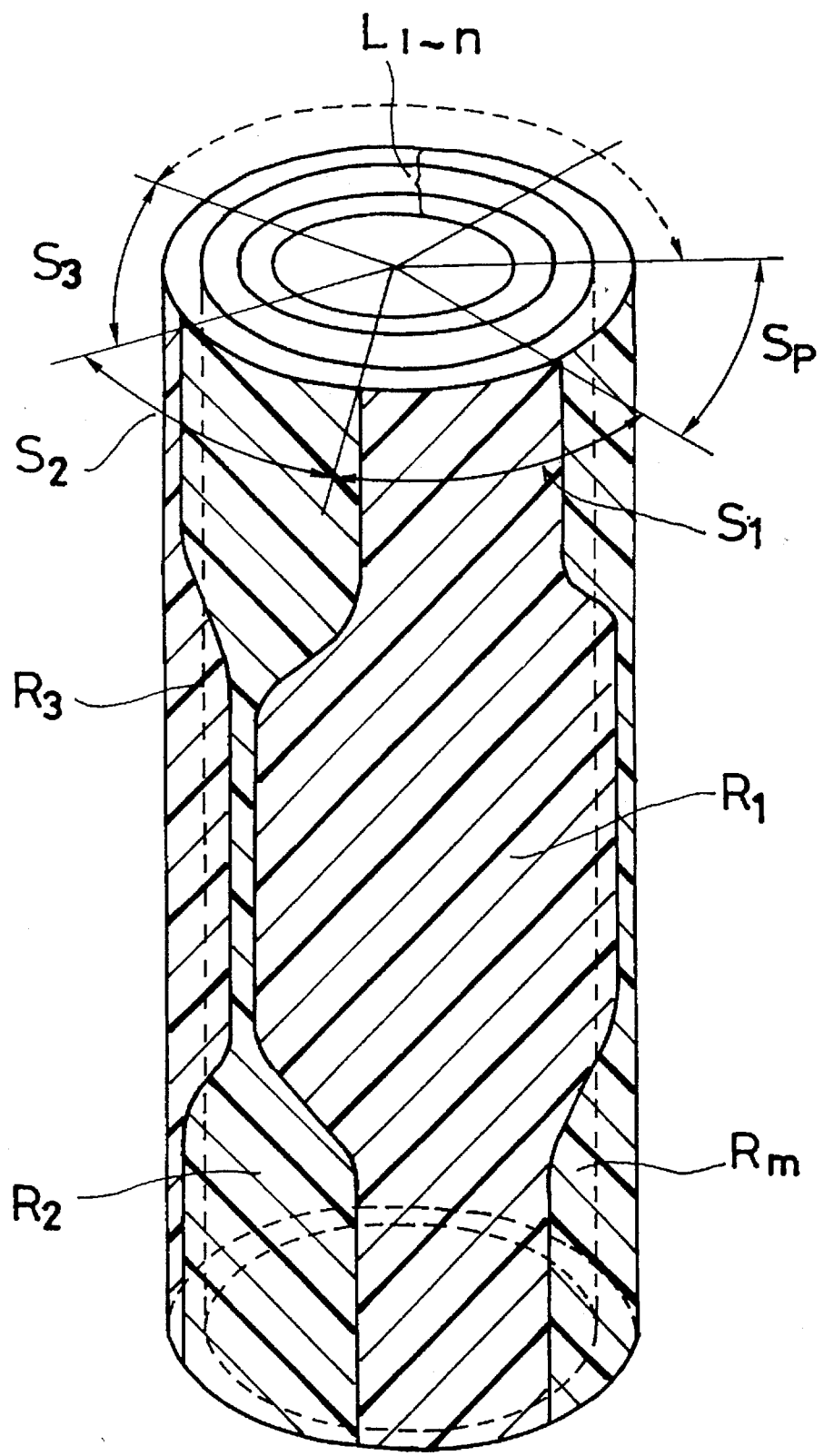
FIG. 48 is an illustration in general of a multilayer parison extruded by the fourth mode of the process and apparatus.
Figure 49:
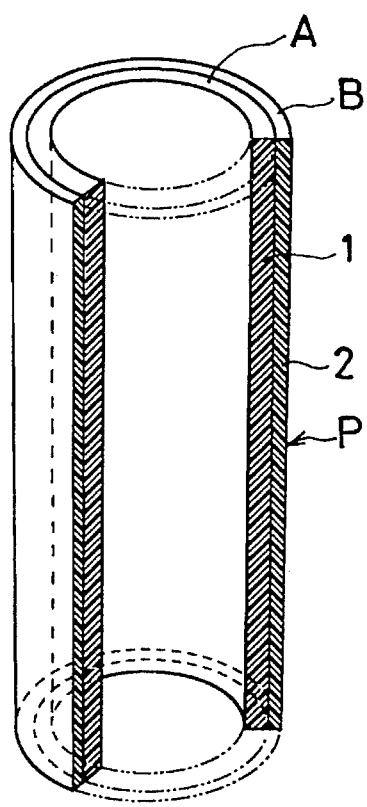
FIGS. 49 to 52 arc schematic illustrations of partial cross sections of multilayer parisons created by prior art processes.
Figure 50:
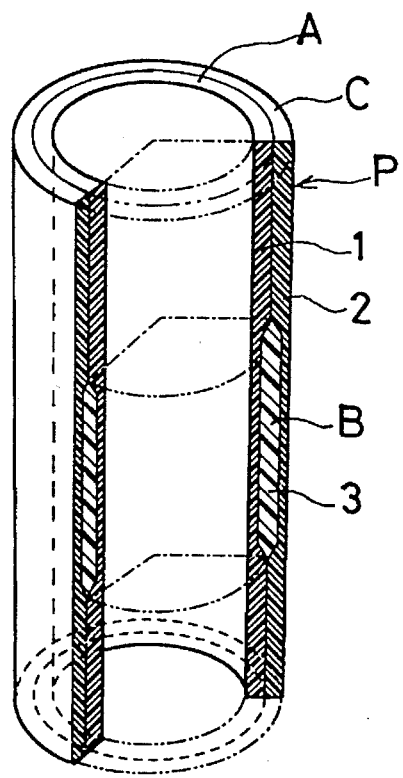
Figure 51:
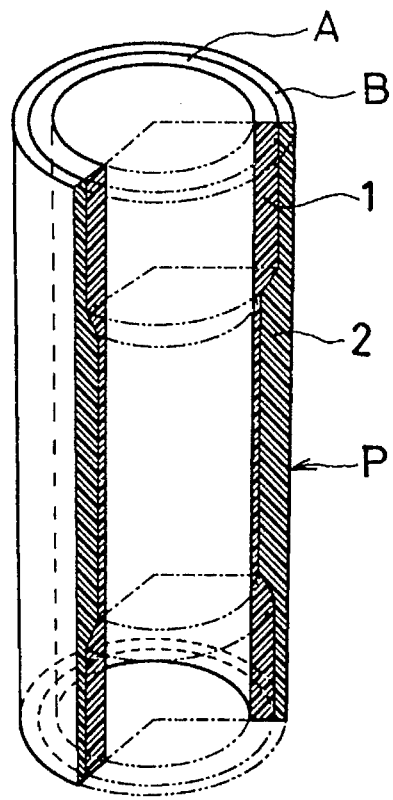
Figure 52:
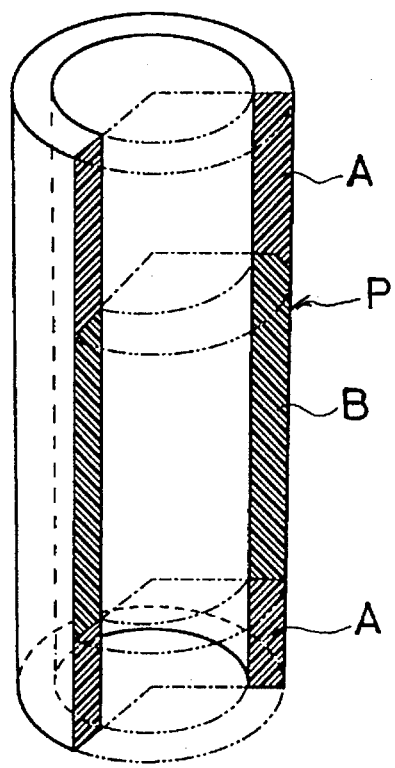

In general, a multilayer parison $P_4$ extruded by the fourth mode of the process and apparatus has an m-resin-n-layer-p-section pattern (m is the number of kind of resins R, n is the number of layer of resins L, and p is the number of sections S in the circumferential direction) with the sectional width changing in the direction of the extrusion of the parison as illustrated in FIG. 48.

In Example 4, the partition walls dividing the annular passage 22a and those dividing the annular passage 22c arc aligned and the flapping nails 43a and 43c are positioned on the same line connecting those partition walls. This arrangement, however, is not absolutely necessary. The flapping nails 43a and 43b may be shifted towards right or left and they may be controlled to flap independently so as to form sections showing different patterns of change in their outer and inner layers.

The aforesaid die head H is assembled as follows.

① Place the assembled multiple passage 20x upon the sectional width controller 41 and fasten with a bolt 28 as shown in FIG. 38.

② Insert the flapping nails 43a and 43c respectively between the funnel-shaped hemispherical shells 42a and 42b and between funnel-shaped hemispherical shells 42c and 42d and hold them in place with the aid of a jig.

③ Insert the torque shaft 45a from the outside of the outermost funnel-shaped hemispherical shell 42d and fix it to each of the flapping nails 43a and 43c by inserting the square tip 49 of the torque shaft into the square hole 50 of the flapping nail.

④ Insert th support pipe 45b over the torque shaft 45a and turn the male screw 51 at its tip into the female screw 52 in each of the flapping nails 43a and 43b.

⑤ Drive the pin 45c through the torque shaft 45a and the support pipe 45b and put them together to construct the driving shaft 45 for each of the flapping nails 43a and 43c.

⑥ Attach the driving device 44 to the driving shaft 45 thus assembled.

⑦ After completion of the mounting of the flapping nails 43a and 43c, attach the resin joint 20y to the lower end of the unit of the multiple passage 20x and the sectional width controller 41 assembled in ①.

⑧ Insert the parison controller shaft 29 into the unit of the multiple passage 20x, the sectional width controller 41, and the resin joint 20y assembled in ⑦ from below along the central axis and connect its upper end to the shaft 30a of the hydraulic cylinder 30 installed above the multiple passage 20x.

⑨ Finally, attach the resin distribution tubes 24a, 24b, 24c, 24d, and 24e to the multiple passage 20x at the specified positions.

Thus, the multilayer blow molding apparatus of Example 4 makes it possible to extrude five kinds of thermoplastic resins in a tubular form from the die head H to create a multilayer parison $P_4$ with a substantially uniform wall thickness in every part and mold said parison into a variety of hollow articles. These hollow articles have sections S different from one another in respect to one or more of the number of kind of resins m, number of layers n, and thickness of layers along the circumference in their cross section and varying in the width along their longitudinal cross section. It is hence possible to blow mold hollow articles with a pattern of marked property change both in their transverse section and in their longitudinal section, draw out from the resins in various sections of the hollow articles sufficient performances in such properties as heat resistance, water resistance, oil resistance, toughness, and abrasion resistance for the intended end uses, and improve the product performance of hollow articles.

What is claimed is:

1. A multilayer blow molding process, comprising extruding plural thermoplastic resins from a die head in a tubular form to create a multilayer parison having a substantially uniform wall thickness in every part, introducing said multilayer parison into a mold split into plural parts and open to receive said parison, clamping said mold and conducting blow molding, said multilayer parison having three or more sections different from one another in respect to one or more of the kind of resins, number of layers, and thickness of layers in the circumferential direction of said parison and varying the wall thickness ratio of the resin layers in at least two sections in the direction of the extrusion of said parison, wherein the wall thickness of said multilayer parison is made substantially uniform in every part regardless of the number of layers in each section by providing in the die head concentric annular passages for molten resins in the number corresponding to the maximum number of layers and feeding any one of resins constituting the sections other than the section having said maximum number of layers through additional concentric annular passages or through the total number of concentric annular passages corresponding to said maximum number of layers to said other sections.

2. A multilayer blow molding process, comprising extruding m kinds (m is an integer and $\geq 2$) of thermoplastic resins from a die head in a tubular form to create a multilayer parison, introducing said multilayer parison into a mold split into plural parts and open to receive said parison, clamping said mold and conducting blow molding, said multilayer parison having p sections (p is an integer and $8 \geq p \geq 2$) of different kinds of resins extending in the longitudinal direction of said parison in a width of a specified central angle in the circumference of said parison and having n number of layers (n is an integer of 1 or more and is 2 or more in one or more sections) in each section and making the wall thickness of said multilayer parison substantially uniform in every part regardless of the number of layers n in each section by providing in the die head concentric annular passages for molten resins in the number corresponding to the maximum number of layer $n_k$ where the number of layers in the first section is designated as $n_1$, that in the second section as $n_2$, that in the pth section as $n_p$, and that in the kth section, which is the section with the largest number of layers, as $n_k$ ($1 \leq k \leq p$) and feeding any one of resins constituting the sections other than the kth section through additional concentric annular passages or through the total number of concentric annular passages corresponding to $n_k$ to said other sections.

3. A multilayer blow molding process of claim 2 wherein a multilayer parison having two equal sections is created, each with a sectional width of 180°, one section containing plural layers of resins and the other section containing an apparent single layer of one resin which is present in the section containing plural layers of resins, wherein a given molten resin is fed to the apparent single-layer section through the same number of concentric annular passages as in the multilayer section to make the wall thickness of the entire multilayer parison substantially uniform.

4. A multilayer blow molding process of claim 2 wherein said multilayer section has three kinds of thermoplastic resins in three layers.

5. A multilayer blow molding process of claim 3 wherein the total quantity of molten resins flowing through the multilayer section is controlled at 0.7 to 1.3 times that of molten resins flowing through the apparent single-layer section.

6. A multilayer blow molding process of claim 2 wherein said die head comprises a multitorus which spreads plural molten resins emerging from extruders into concentric annular passages, a lotus root which constitutes passages for forming sections corresponding to different kinds of resins, number layers, and thickness of layers in the circumferential direction of the multilayer parison, an octopus which forms passages connecting said multitorus and said lotus root, and a nozzle which is located beneath said lotus root and extrudes said multilayer parison.

* * * * *